United States Patent [19]

Slater et al.

[11] 4,114,027
[45] Sep. 12, 1978

[54] ON-LINE/OFF-LINE AUTOMATED BANKING SYSTEM

[75] Inventors: Charles E. Slater, Hamilton; Paul E. Dunn; Lewis B. Mustain, both of Cincinnati, all of Ohio

[73] Assignee: The Mosler Safe Company, Hamilton, Ohio

[21] Appl. No.: 722,741

[22] Filed: Sep. 13, 1976

[51] Int. Cl.$^2$ .................. G06K 5/00; G06F 7/00; H04Q 9/00
[52] U.S. Cl. .................. 235/419; 340/149 A; 340/152 R
[58] Field of Search ............ 235/61.7 B, 61.7 R, 235/61.6 R; 340/149 A, 152 R; 194/4

[56] References Cited
U.S. PATENT DOCUMENTS

| 3,852,571 | 12/1974 | Hall et al. | 235/61.7 B |
| 3,937,925 | 2/1976 | Boothroyd | 235/61.7 B |
| 3,941,977 | 3/1976 | Voss et al. | 235/61.7 B |
| 3,956,615 | 5/1976 | Anderson et al. | 235/61.7 B |
| 4,011,433 | 3/1977 | Tateisi et al. | 235/61.7 B |

Primary Examiner—Daryl W. Cook
Attorney, Agent, or Firm—Wood, Herron & Evans

[57] ABSTRACT

An automated banking system, which comprises at least one remote transaction and cash dispensing unit interconnected with a central unit via a communication network is disclosed. Each remote unit is operable following a single customer card insertion, in either a first mode or a second mode, to process one or more transactions, including cash withdrawal, fund transfer and payment and deposit transactions. The central unit determines the mode of operation of each remote unit. In the first mode, the central unit communicates data to a remote unit following a request from the remote unit. The central unit may transmit information for updating the customer's card. The central unit communicates actual account balances which the remote unit reports to the customer. From other communicated data, which includes account descriptions, the remote unit determines which transactions a customer may perform. The remote unit then processes customer-selected transactions in accordance with additional communicated data, which includes working balances, an extended credit balance and a maximum cash limit. In the second mode, the remote unit does not communicate with the central unit, but itself both determines which transactions a customer may perform and processes customer-selected transactions in accordance with information included on the customer's card. In the first mode, the remote unit communicates customer transaction data to the central unit immediately after the customer completes his transactions. The remote unit, in the second mode, records customer transaction data which it communicates to the central unit when the remote unit becomes operable in the first mode. Line security and customer verification schemes are provided to protect the integrity of the system. Additional features are disclosed.

57 Claims, 18 Drawing Figures

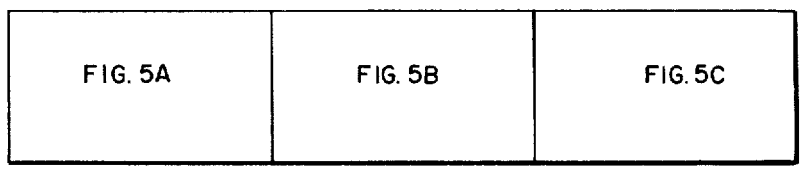
FIG. 5
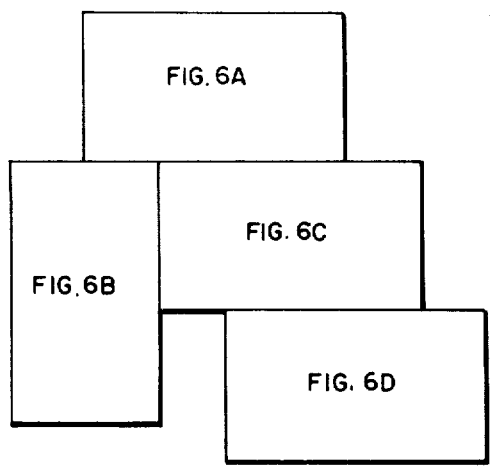
FIG. 6
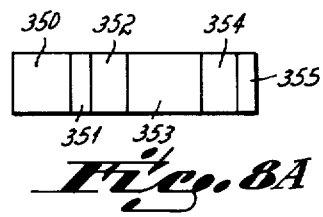
FIG. 8
FIG. 8A
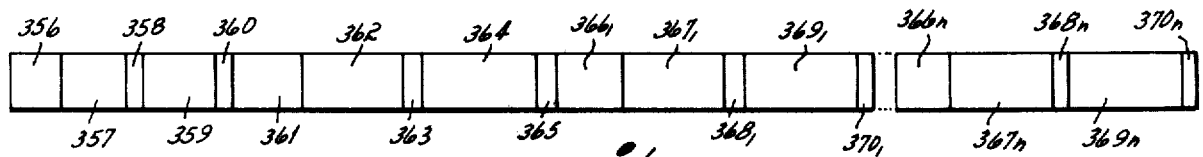
FIG. 7
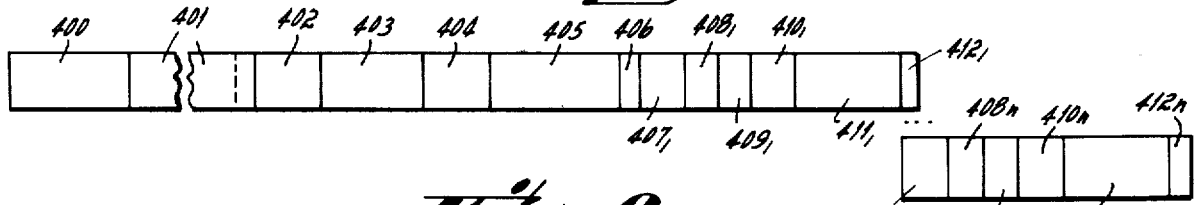
FIG. 8B
FIG. 9

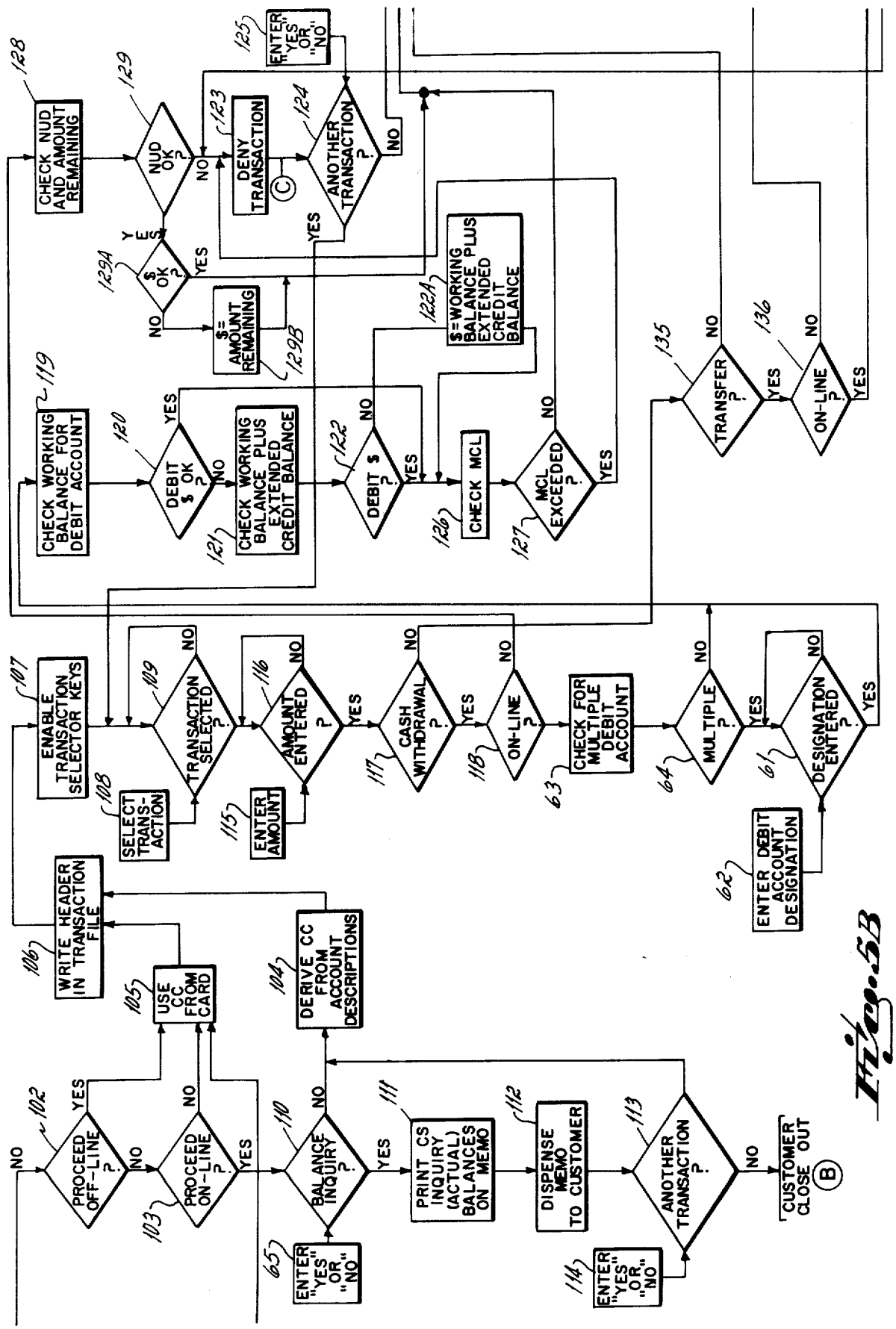

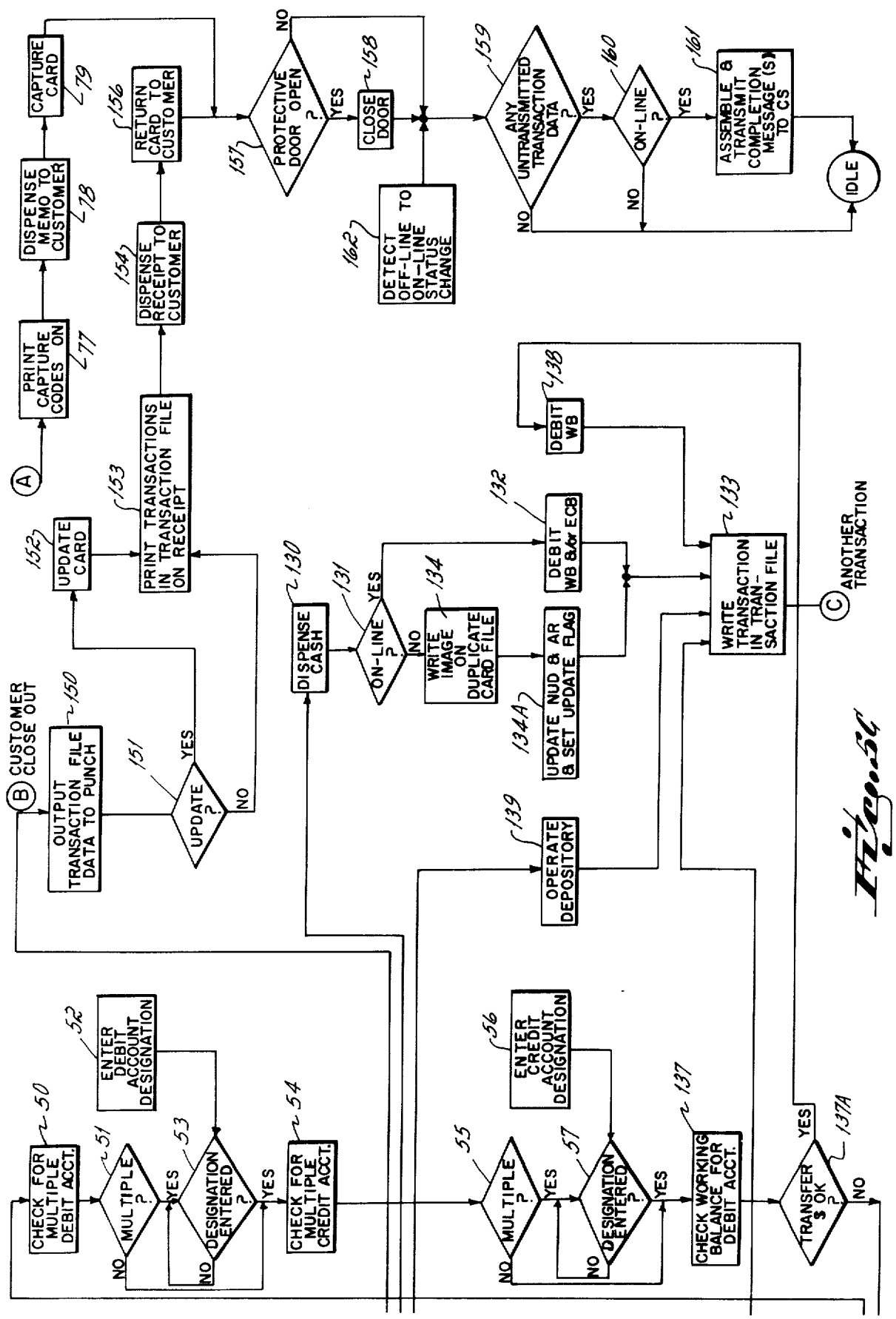

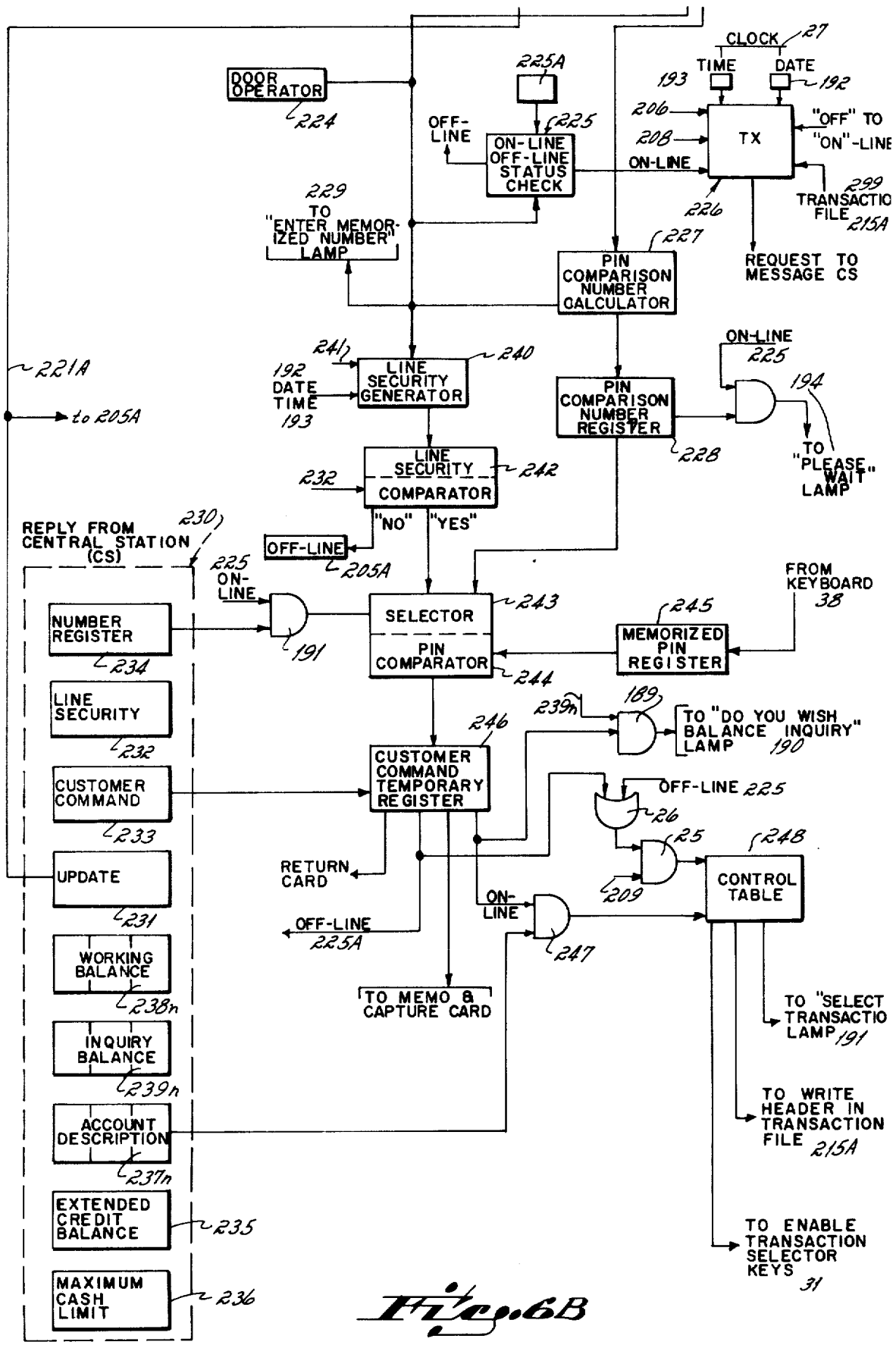

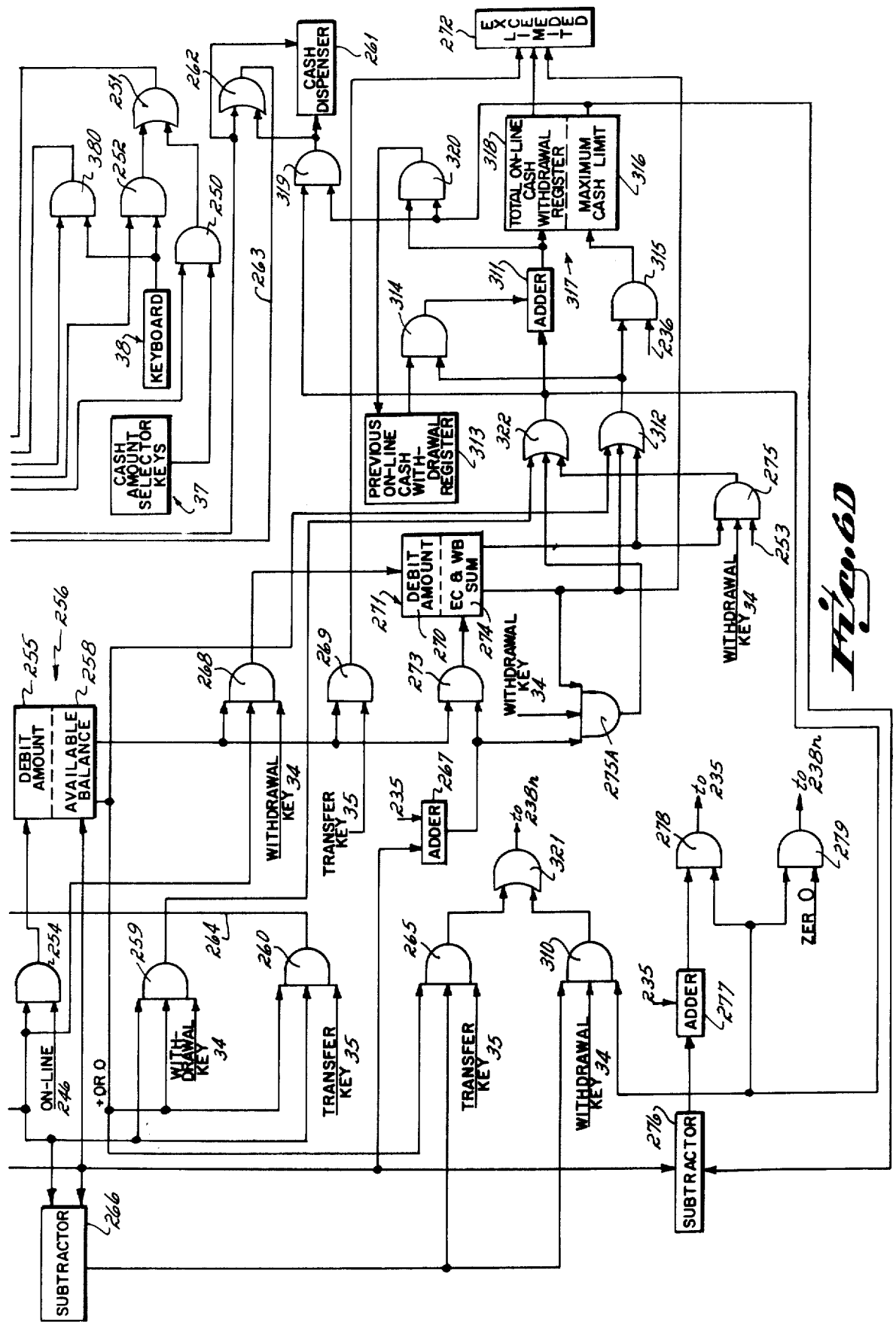

ON-LINE/OFF-LINE AUTOMATED BANKING SYSTEM

BACKGROUND OF THE INVENTION

The present invention relates to a system for processing commercial or financial transactions and, specifically, to an automated banking system which includes central and remote units interconnected by a communication network for processing commercial or financial transactions.

Businesses and, more particularly, banks continually search for new business methods to reduce the cost of their commercial or financial services. However, banks must maintain the quality of the services which they offer and, due to competition, must constantly improve their services in order to keep present customers and attract new customers. To accomplish these objectives, banks have resorted to establishment of branch offices. By using branch offices, banks are able to make their services more convenient to present customers in outlying areas, rather than requiring them to utilize a central location. They are also able to attract new customers who seek a conveniently located bank. However, branch banking is expensive since each branch office requires substantial capital investment and operational expense. Where the expense of a branch bank is not feasible or justified, but the bank still wishes to provide services in a effort to transact more business with its present customers and/or attract new customers, banks have installed manned, or staffed, counters in supermarkets, shopping center malls and airports.

Another pressure on banks for added services stems from customers' inability to satisfy their banking needs during normal banking hours except at considerable inconvenience, such as when customers must interrupt their work to journey to the bank during normal banking hours because banking hours coincide with their working hours. Thus, customers want extended banking hours or after hours banking. Additionally, most banks are closed on Saturday and Sunday, yet a substantial share of purchases of consumer goods occur on weekends. As a result, customers want access to the bank on weekends. Customers also wish to transact business around the clock at locations such as hospitals, hotels and bus depots, airpots, etc. Thus, customers' demand for after hours, weekend and around-the-clock banking services has increased the problem banks have in satisfying their customers.

To meet these needs banks have begun to use unmanned, automated card-actuated banking equipment. Voss et al., "Off-Line Cash Dispenser and Banking System," U.S. Pat. No. 3,845,277 discloses such an unmanned, automated card-actuated teller. The teller unit is completely self-contained, relying on data stored on the customer's card and/or stored locally in a memory at the site of the installation to limit the nature and/or amount of the transaction. Such equipment can be located at a remote location to serve as a branch office at significantly reduced capital investment and operational expense, or outside a bank building for use when the bank is closed. In either case, the customer receives the benefit of after hours, weekend and around-the-clock banking services, including cash withdrawal, fund transfer and payment and deposit transactions.

While these teller units have been extremely useful, they are not without limitations. For example, the immediate centralized accounting capability of conventional teller-assisted banking systems, which facilitates maintenance of an up-to-date running balance of each customer's account, is absent. Moreover, the teller unit must operate under limitations imposed by the types and amounts of data which are encoded on the customer's card and which can be stored locally in the teller unit memory. To increase the flexibility of the teller unit by increasing the size of the memory and/or the amount of hardware increases the cost.

An even more recent development in automated banking comprehends providing a plurality of remotely located teller machines which are each interconnected with a central unit via a communication network. These remote teller machines operate in what is termed an "on-line" mode. That is, each remotely located teller machine serves as an input/output (I/O) terminal relative to the centrally located unit. The remote teller machine transmits transaction data to the central unit. The central unit processes the transaction and generates an authorization or denial code for transmission to the remote teller machine. Prior to transmitting the code, the central unit ascertains the condition of the remote teller machine to receive the code. If the remote teller machine responds that it is in condition to receive the code, the central unit transmits the code to the remote teller machine. The remote teller machine executes the transaction in accordance with the code and thereafter transmits transaction completion data to the central unit. The central unit then accounts for the transaction. This "on-line" seqence is followed for each and every transaction by each and every customer.

The foregoing "on-line" equipment, wherein the remote teller machines are linked with, and controlled by, a central unit are to be distinguished from the previously described teller units which are self-contained, i.e., not linked with or controlled by a central unit. Such previously described completely self-contained teller units are often termed "off-line" teller machines.

One objective of the present invention is to provide an alternative to branch banking by providing teller units in remote areas at significantly reduced capital investment and operational expense. Another objective is to provide teller units for the transaction of banking business after normal bank hours, on weekends and around-the-clock.

It is also an objective of the present invention to provide a remote unit which is operable in both an "off-line" mode and an "on-line" mode; that is, a remote unit which is operable to process transactions either with or without communication with a central unit, depending on the availability of the central unit, which is often needed by the bank for other purposes and unavailable to assist in remote unit transactions.

Another objective of the present invention is to provide a remote unit which, in the "on-line" mode, does not depent on an authorization or denial code from the central unit but instead operates to economize central unit processing time and communication time with the central unit by processing one or more customer transactions following a single data transmission from the central unit.

The present invention also has as an objective the recording of all transaction data at the remote unit, when operating in either the "on-line" mode or the "off-line" mode, and the communication of all transaction data to the central unit for centralized accounting purposes either immediately after the customer completes his transactions when in the "on-line" mode or after the system becomes operable in the "on-line" mode if the transaction is one which occurred when the system was in the "off-line" mode.

The present invention also has an objective the provision of improved line security for the protection of system integrity. However, if for some reason in the "on-line" mode line security should not exist, the system will change its status from the "on-line" mode to the "off-line" mode. Thus, the customer is given the opportunity to perform transactions "off-line" in the event unavoidable circumstances, such as faulty "on-line" data communication, would inhibit the customer from conducting transactions "on-line."

SUMMARY OF THE INVENTION

These and other objectives are accomplished in a preferred embodiment of the present invention by providing an automated banking system having at least one card-actuated remote transaction and cash dispensing unit interconnected with a central unit via a communication network. Each remote unit is operable in either a first, "on-line" mode or a second, "off-line," with the mode of operation preferably being determined by the central unit.

In the "on-line" mode, the remote unit reads a customer's card and performs checks on the card, such as a check of a discretionary file in a remote unit memory to determine, for example, whether or not the card has been reported stolen. Only if the checks indicate that the card should not be retained by the remote unit or returned to the customer does the remote unit transmit a request message, including the customer's account number encoded on the card, to the central unit. No transaction data, such as amount of money to be withdrawn, debit account or the like, is included in the request message.

The central unit uses the customer's account number to access the customer's account files, from which the central unit calculates working balances, an extended credit balance and a maximum cash limit. This calculated data, together with actual account balances and account descriptions are transmitted to the inquiring remote unit in a reply message. The reply message in this invention contains only account data; that is, the data content of the reply message in this invention is completely independent and unrelated to the amount or type of transaction desired by the customer at the remote unit, which latter information, as noted, is not even transmitted to the central unit in the request message.

After receiving the reply message, the remote unit of the system of the present invention reports the actual account balances contained in the reply to the customer on request, for example, in the form of a printed memorandum, to advise the customer with regard to his account balances. This facilitates selection by the customer of transactions which are appropriate for the types of accounts the customer has as well as their balances. The remote unit operates to process one or a series of customer transactions, including cash withdrawal, fund transfer between accounts and deposit and payment transactions, based on an evaluation of (a) the types of the customer's various accounts, (b) the amount and nature of the customer request selected by the customer at the remote unit, and (c) the customer's account data transmitted from the central unit. For example, the remote unit determines from the account descriptions received in the reply from the central unit the identity of permissible transactions which a customer may select. If the account description include an account description for a savings account and an account description for a checking account, withdrawals from savings and checking and transfers from savings to checking and checking to savings would be permissible transactions. The remote unit uses the working balances received in the reply from the central unit to determine the amount of funds from each account which the customer has available for the permissible transactions which he selects. The remote unit uses the extended credit balance contained in the reply message as the amount which the customer has available for cash withdrawal transactions where the selected amount of cash withdrawal exceeds the working balance for the designated debit account. Finally, the remote unit uses the maximum cash limit transmitted from the central unit as the amount which imposes a restraint on the total for cash withdrawals by the customer regardless of the customer's working balance and/or extended credit balance.

The remote unit may assemble and transmit in the request message to the central unit certain other information read from the customer's card, including a control code. When a customer's control code is received in the request message, the central unit can determine which customer account files are available and which customer account files are unavailable. The central unit assembles and transmits in the reply message (a) the account descriptions, working balances, etc. for those customer accounts which are available and (b) the account descriptions and blank fields, for example, for working balances, etc., for those customer accounts which are unavailable. The remote unit processes the transactions which the customer selects like in the on-line operation above, in the off-line operation below, or in a mixed on-line/off-line operation depending upon whether all accounts are available, no accounts are available, or some accounts are available and others are unavailable, respectively. This allows the customer to select the same transactions in both the on-line and off-line modes of operation.

Thus, the present invention provides an "on-line" system wherein one or more customer-selected transactions are processed, and an evaluation made whether or not to proceed, by decision-making logic located at the remote unit, rather than at the central unit. The system of the present invention requires only a single data communication from the remote unit to the central unit, and a single data communication from the central unit to the remote unit, to enable the remote unit to process and evaluate, either grant or deny, one or a series of transactions which a customer selects. This reduces central unit processing time and system communication time. Of course, once the transactions are completed at the remote unit, a single transmission of the nature and amount of the transaction to the central unit with suffice to permit the central unit records to be updated to reflect the transaction. Such an "on-line" system is to be contrasted with prior art schemes in which the central station determines the propriety of the transaction by comparison at the central station of (a) transaction data transmitted from the remote unit and (b) account data stored at the central station, and thereafter sends an "approval" or "disapproval" reply to the remote unit which then grants or denies the customer request depending upon whether it was approved or disapproved by the central unit.

The system of the present invention also provides "off-line" operation of the remote unit when access to the central unit is not available or desired. In the "off-line" mode, the remote unit does not communicate with the central unit. In the "off-line" mode, the remote unit is operable following a single customer card insertion to process one or more customer transactions, including cash withdrawal, fund transfer between accounts and deposit and payment transactions based on an evaluation of data encoded on the customer's card. The card includes a control code which identifies permissible transactions from which the remote unit determines which transactions a customer may select. The card also includes, for example, a next usage date and a credit amount remaining, which the remote unit uses to evaluate a cash withdrawal transaction. In the "off-line" mode the remote unit records customer transaction data for all "off-line" transactions and subsequently transmits the transaction data in a series of completion messages to the central unit when the system resumes "on-line" operation.

In the "on-line" mode the integrity of the system of the present invention is protected by line security which requires a favorable comparison at the remote unit of remotely and centrally calculated line security codes before the remote unit will utilize other data in the reply message from the central unit to process customer transactions. The line security system of the present invention economizes by substituting a clock for the conventional random or pseudo-random number generator typically found at the remote unit. The central unit of the system of the present invention calculates a line security code as a function of date and time data generated by the remote unit clock which is transmitted by the remote unit to the central unit in the request message. The line security code calculated by the central unit is transmitted to the remote unit in the reply and must match the line security code calculated locally by the remote unit. Since the time and date continuously changes, the line security codes also change continuously, enhancing security. However, if the centrally and locally calculated line security codes do not match, due to transmission of an incorrect security code by one who has accessed the communication network in an attempt to defraud the bank or merely data communication problems which preclude proper transmission of the centrally calculated line security code to the remote unit, the customer is not foreclosed from performing transactions. If the line security codes do not match, the system simply changes from the "on-line" mode to the "off-line" mode and the customer is permitted to perform transactions "off-line".

BRIEF DESCRIPTION OF THE DRAWINGS

The foregoing objectives and advantages of the present invention will become clear from the following detailed description thereof given in connection with the drawing in which:

FIG. 7 illustrates the message format of a request transmitted from the remote unit to the central unit;

FIG. 8, comprising FIGS. 8A and 8B connected as shown, illustrates the mesage format of a reply transmitted from the central unit to the remote unit; and FIG. 9 illustrates the message format of a completion message transmitted from the remote unit to the central unit.

GENERAL DESCRIPTION OF SYSTEM AND OPERATION

Figure 1:
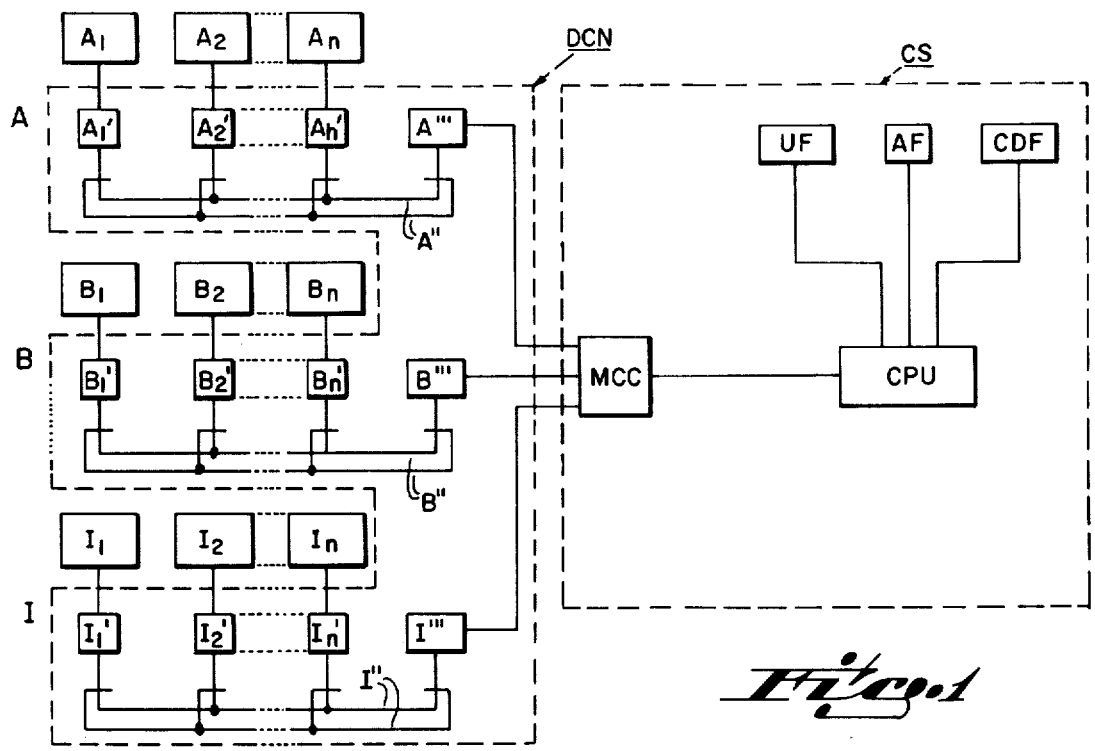
FIG. 1 is a block diagram of the on-line/off-line automated banking system of the present invention.

FIG. 1 is a block diagram of the on-line/off-line automated banking system of the present invention. The system includes one or more remote stations A, B . . . I; a data communication network DCN; and a central station CS.

Each remote station has associated therewith one or more remote units, for example, remote units $A_1$, $A_2$ . . . $A_n$ are associated with remote station A, remote units $B_1$, $B_2$ . . . $B_n$ are associated with remote station B and remote unit $I_1$, I . . . $I_n$ are associated with remote station I. In order to facilitate use of the present invention in data communication networks of conventional teller-assisted on-line banking systems, remote units $A_1$, $A_2$ . . . $A_n$, $B_1$, $B_2$ . . . $B_n$ . . . $I_1$, $I_2$ . . . $I_n$ of the present invention are constructed to emulate conventional I/O terminals, such as CRT's and teletypewriters, and terminal communication controllers presently employed in conventional teller-assisted on-line banking systems. Thus, each remote unit $A_1$, $A_2$ . . . $A_n$, $B_1$, $B_2$ . . . $B_n$ . . . $I_1$, $I_2$ . . . $I_n$ may be constructed in a conventional manner to emulate a remote IBM 2848controller with one IBM 2260 CRT attached, a remote IBM 3272 controller with one IBM 3270 CRT attached or a remote IBM 2972 controller with one IBM 2980 CRT attached. Each remote unit $A_1$, $A_2$ . . . $A_n$, $B_1$, $B_2$ . . . $B_n$ . . . $I_1$, $I_2$ . . . $I_n$ may also be constructed in a conventional manner to emulate certain Burroughs and NCR terminal facilities. As a result, remote units $A_1$, $A_2$ . . . $A_n$, $B_1$, $B_2$ . . . $B_n$ . . . $I_1$, $I_2$ . . . $I_n$ may be interchanged with I/O terminal facilities in conventional teller-assisted on-line banking systems to provide an on-line/off-line automated banking system capability. Each remote station also has associated therewith a set of voice-grade data transmission lines, such as telephone wires; that is, telephone wires A" are associated with remote station A, telephone wires B" are associated with remote station B and telephone wires I" are associated with remote station I.

Each remote unit associated with a remote station connects via a modem to the telephone wires associated with the remote station, for example, remote units $A_1$, $A_2$ . . . $A_n$ connect via modems $A_1'$, $A_2'$ . . . $A_n'$, respectively, to telephone wires A" at remote station A, remote units $B_1$, $B_2$ . . . $B_n$ connect via modems $B_1'$, $B_2'$ . . . $B_n'$, respectively, to telephone wires B" at remote station B and remote units $I_1$, $I_2$ . . . $I_n$ connect via modems $I_1'$, $I_2'$ . . . $I_n'$, respectively, to telephone wires I" at remote station I.

Each set of telephone wires associated with a remote station connects via a modem to a master communication controller MCC associated with central station CS, for example, telephone wires A" connect via modem A'" to master communication controller MCC, telephone wires B" connect via modem B'" to master communication controller MCC and telephone wires I" connect via modem I'" to master communication controller MCC. Master communicaion controller MCC interfaces with a central processing unit CPU at central station CS.

Modems $A_1'$, $A_2'$ ... $A_n'$, $B_1'$, $B_2'$ ... $B_n'$ ... $I_1'$, $I_2'$ ... $I_n'$ and A'", B'" ... I'" and master communication controller MCC handle encoding and transmission of data between remote units $A_1$, $A_2$ ... $A_n$, $B_1$, $B_2$ ... $B_n$ ... $I_1$, $I_2$ ... $I_n$ and data processing unit CPU over telephone wires A", B" ... I".

A representative system of the present invention might comprise, for example, remote units $A_1$, $A_2$ ... $A_n$, $B_1$, $B_2$ ... $B_n$ ... $I_1$, $I_2$ ... $I_n$ constructed to emulate remote IBM 2848 controllers with IBM 2260 CRT's attached; DEC DL-11 asynchronous line interfaces (not shown); Bell 202 modems employing telephone company four wire half duplex service; and IBM system 370 integrated communications adapter; and an IBM system 370 computer.

A, for example, in FIG. 1 has been described as a remote station having remote units $A_1$, $A_2$ ... $A_n$. However, A may represent, for example, one or more financial institutions having remote units $A_1$, $A_2$ ... $A_n$ at various locations. each remote unit $A_1$, $A_2$ ... $A_n$ would connect via a modem $A_1'$, $A_2'$ ... $A_n'$, respectively, at each branch location to telephone wires A", whereby remote units $A_1$, $A_2$ ... $A_n$ would be connected to, or multidropped on, the same set of telephone wires. Telephone wires A" would connect via modem A'" to master communication controller MCC. Master communication controller MCC would interface with central processing unit CPU at central station CS.

Figure 2:
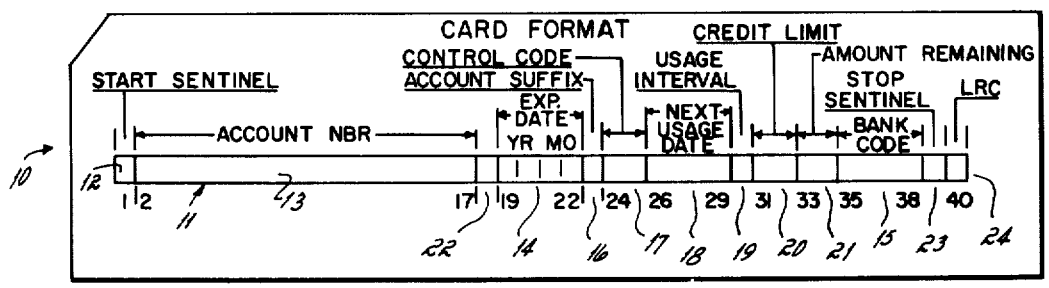
FIG. 2 illustrates a preferred form of a customer card utilized in the system of the present invention.

FIG. 2 illustrates a card 10 which a bank issues to a customer to whom it extends use of the on-line/off-line automated banking system of the present invention. Card 10 includes a ferrous oxide strip 11 which is magnetically encoded with fields of data. Each field of data consists of one or more groups of four-bit BCD characters plus a character parity bit.

Figure 3:
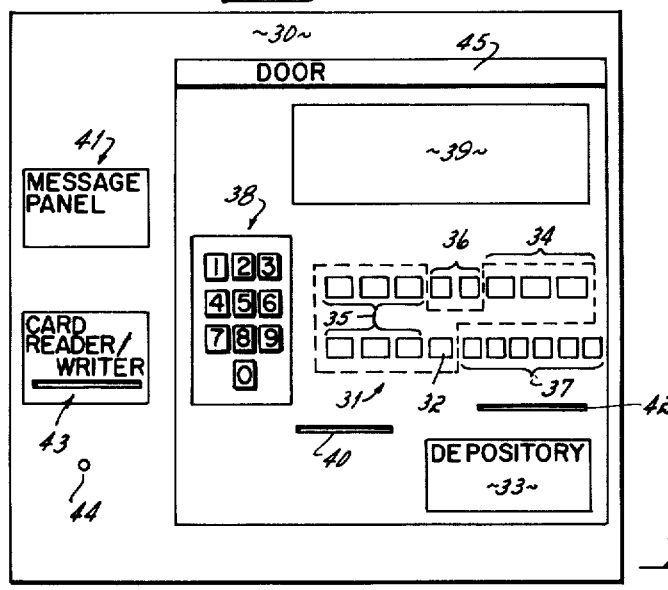
FIG. 3 is a front elevational view of a panel of a remote transaction and cash dispensing unit employed in the system of the present invention.

A first field of data, account number field 13, consists of 16 characters which comprise an account number for the customer. A second field of data, account suffix field 16, consists of one character which identifies the customer as the holder of one of a plurality of cards which have the same account number in account number field 13, such as when separate cards are provided for different members of a given family. A third field of data, expiration date field 14, consists of four characters which identify card 10 expiration date by month and year. A fourth field of data, bank code field 15, consists of four characters. Bank code field 15 identifies the commercial bank or other financial institution such as a savings and loan, credit union, etc. with which the customer maintains his accounts. Start sentinel field 12, separator field 22, stop sentinel field 23 and longitudinal register check (LRC) field 24 consist individually of one character. Each of these data fields functions to effect control of card reader/writer 43 (FIG. 3). Other fields of data include control code field 17, next usage date field 18, usage interval field 19, credit limit field 20 and amount remaining field 21. These fields of data relate primarily to off-line operation and are described in greater detail in Voss et al., "Off-Line Cash Dispenser and Banking System," U.S. Pat. No. 3,845,277, which is incorporated by reference herein.

FIG. 3 illustrates a panel 30 which is associated with a remote unit 60 of the on-line/off-line automated banking system of the present invention. Panel 30 includes a card reader/writer 43 into which the customer inserts card 10 to initiate use of the system. The customer operates card return switch 44 to cancel his use of the system and to have card 10 returned to him prior to his selection of a transaction. A message display 41 communicates messages, such as "Enter Card," to the customer. With the exception of card reader/writer 43, card return switch 44 and message display 41, panel 30 is concealed behind a vertically movable protective door 45 (shown in its open position) when remote unit 60 is idle.

The customer operates keyboard 38 to enter digits of a personal identification number (PIN) which he was instructed to memorize at the time he was issued his card. Remote unit 60 compares the customer's PIN with a number which is derived from data on card 10 to verify that the customer is the rightful user of the card. The card verification technique disclosed in Spetz, "Verification System," U.S. Pat. No. 3,794,813, incorporated herein by reference, may be reference, may be used to verify a cardholder, if desired.

Panel 30 also includes illuminable plush button transaction selector keys 31. Remote unit 60 selectively enables certain transaction selector keys 31 so that the customer may select a transaction. Transaction selector keys 31 may be provided for any of numerous different transactions in the basic categories of withdrawal, transfer and payment and deposit transactions. The number and designation of transaction selector keys 31, which will be described below, provide a selection of various exemplary transactions in the basic categories and are not intended to limit the number or designation of transaction selector keys which may be included in panel 30.

The customer operates deposit/payment key 32 to select deposit and payment transactions. The customer must enter the amount of a deposit or payment by operating the numerical keys of keyboard 38. The customer inserts deposits and payments in depository 33.

A group of three illuminable push button transaction selector keys 34 is associated with cash withdrawal transactions. The customer operates one of the transaction selector keys 34 to select a cash withdrawal from his credit card account, a cash withdrawal from his checking account or a cash withdrawal from his savings account. The customer must enter the amount of a cash withdrawal by operating the illuminable push button cash amount selector keys 37. Paper currency is dispensed to the customer via cash slot 40. A cash dispenser of the type disclosed in Ransom et al., "Dispenser for Documents Such As Currency and the Like," U.S. Pat. No. 3,795,395 may be used, if desired.

A group of six illuminable push button transaction selector keys 35 is associated with transfer transactions. The customer operates one of the transaction selector keys 35 to select (a) transfer of funds from his checking account to his savings account, from his credit card account to his checking account, or from his savings account to his checking account; (b) loan payment comprising a transfer of funds from his checking account to his credit card account or from his checking account to his loan account; or (c) mortgage payment comprising a transfer of funds from his checking account to his mortgage account. The customer must enter the amount of a fund transfer by operating the numerical keys of keyboard 38.

Display panel 38 reports amounts which the customer enters on keyboard 38. Display panel 30 also communicates instructional messages to the customer which guide the customer as he performs transactions. For example, display panel 39 instructs the customer to "Select Transaction."

Panel 30 includes a pair of illuminable push button "Yes" and "No" keys 36 which the customer operates to respond "yes" and "no" to queries such as "Do You Wish Balance Inquiry?" which remote unit 60 displays on display panel 39. If the customer requests, a memorandum containing the customer's actual account balances is printed and dispensed to the customer through printer slot 42 in on-line operation. A receipt containing the customer's transaction data which is generated at the end of each series of one or more transactions by a customer is printed and dispensed to the customer through printer slot 42 in both on-line and off-line operation.

Figure 4:
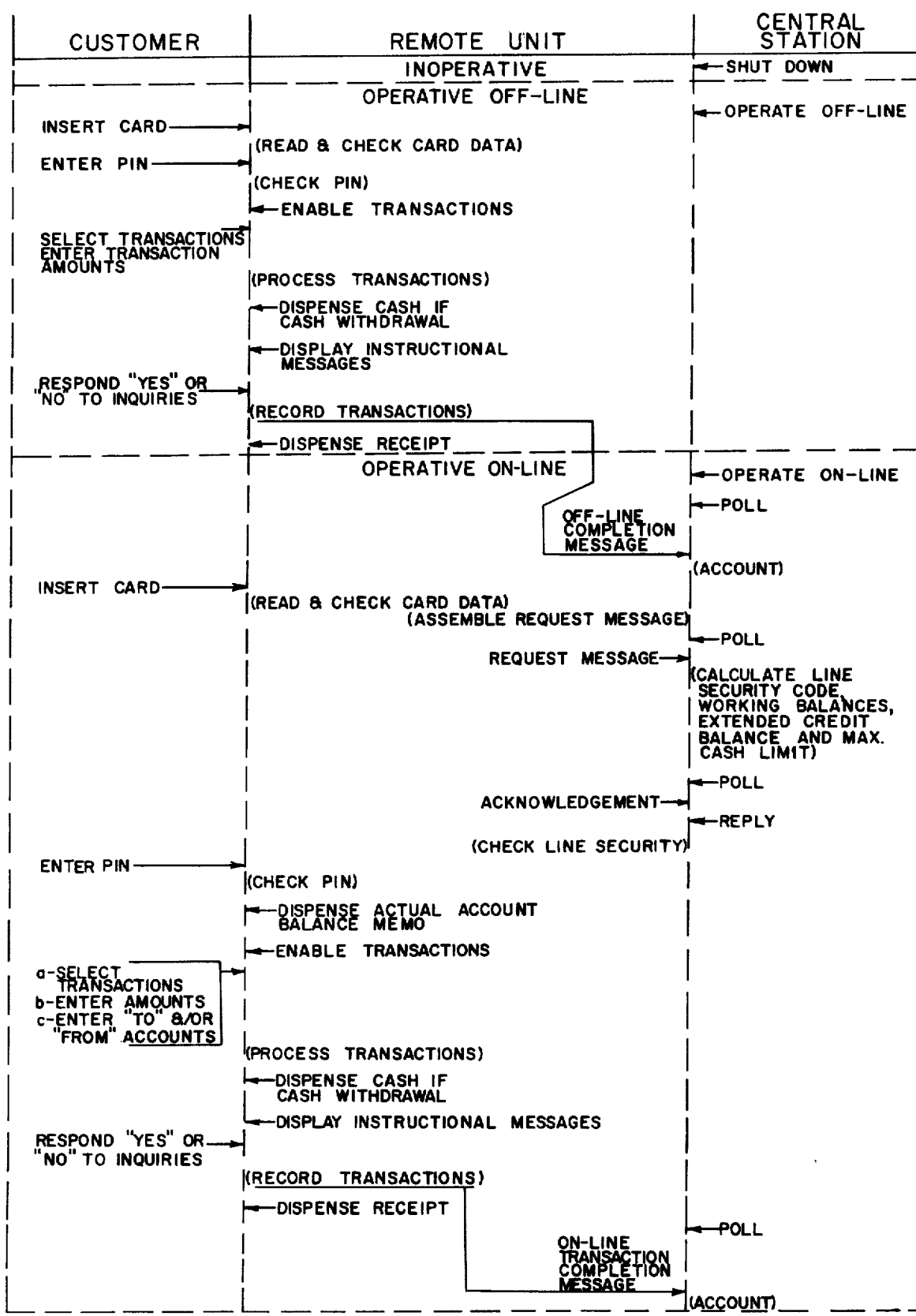
FIG. 4 is a flow diagram of the general operation of the system which is depicted in FIG. 1.

FIG. 4 is a flow diagram of the general operation of the system which is depicted in the block diagram of FIG. 1. Preferably, central station CS controls the operational status of each remote unit $A_1, A_2 \ldots A_n, B_1, B_2 \ldots B_n \ldots I_1, I_2 \ldots I_n$ (FIG. 1). Thus, the central processing unit CPU may (a) command a remote unit to shut down, thereby rendering the remote unit inoperative; (b) command a remote unit to operate off-line, thereby rendering the remote unit operable in an off-line mode; or (c) command a remote unit to operate on-line, thereby rendering the remote unit operable in an on-line mode.

Referring to FIGS. 2, 3 and 4, when a remote unit is in its off-line operational mode, the remote unit operates in the manner generally described in Vos et al., "Off-Line Cash Dispenser and Banking System," U.S. Pat. No. 3,845,277 which has been incorporated by reference herein.

If a customer inserts his card while the remote unit is in its off-line operational mode, the remote unit reads the card and checks the card data for parity. The remote unit checks bank code 15. The remote unit returns the card to the customer if bank code 15 does not appear in a bank code file in remote unit memory, thereby indicating that the card is not usable in the system. If bank code 15 does appear in the bank code film, the remote unit subsequently checks the card data against images in a duplicate card file in remote unit memory. A match indicates a fraud based on card duplication, and the remote unit captures the card. If there is no match, the remote unit then checks account number 13 and account suffix 16 against numbers in a discretionary file in remote unit memory. If this check produces a match, the remote unit determines from other data in the discretionary file what action to take. For example, if the data associated with the matching account number and account suffix in the discretionary file consists entirely of zeros, the remote unit captures the card, and, if the data is non-zero, the remote unit sets an update flag and later uses the discretionary file data as a source of updating information for the card. The remote unit checks credit limit 20 against the maximum credit limit which is associated with bank code 15. If the credit limit on the card exceeds the maximum credit limit for the bank, the remote unit captures the card. Otherwise the remote unit checks expiration date 14 and captures the card if it has expired.

If the card passes the above checks when the remote unit is in its off-line operational mode, the remote unit compares the PIN which the customer enters with a number which the remote unit calculates using account number 13 and an algorithm which is associated with bank code 15. If a match occurs, the remote unit enables certain of transaction selector keys 31 for customer selection depending on control code 17. The customer is instructed to "Select Transaction" and thereafter "Enter Amount" by the remote unit on display panel 39.

Once the customer selects one of the enabled transactions using one of the transaction selector keys 31 and enters an amount using either amount selector keys 37 or keyboard 38, the remote unit proceeds to determine what type of transaction the customer has selected. Each of the transactions falls into one of three categories; that is, each transaction is (a) a cash withdrawal, (b) a fund transfer, or (c) a deposit or payment.

If the customer selects a cash withdrawal while the system is off-line, the remote unit checks next usage date 18 to determine whether or not the current date is the same as or later than the next usage date. If the current date is not the same as or later than next usage date 18, the remote unit denies the cash withdrawal and queries the customer whether or not he desires "Another Transaction?" on display panel 39. If the current date is the same as or later than next usage date 18, the remote unit compares the amount entered by the customer using amount selector keys 37 with amount remaining 21. The remote unit dispenses cash to the customer in the amount entered by the customer provided, however, that the amount entered by the customer does not exceed amount remaining 21. If the amount entered by the customer exceeds amount remaining 21, the remote unit dispenses cash equivalent to amount remaining 21, in which case the remote unit informs the customer that he has exceeded his credit limit on display panel 39.

In the case of an off-line cash withdrawal, the remote unit writes the image of card 10 on the duplicate card file. The remote unit updates amount remaining 21 by subtracting from amount remaining 21 the amount of cash dispensed if the amount requested by the customer does not exceed amount remaining 21. If the amount requested by the customer exceeds amount remaining 21, the remote unit updates next usage date 18 to the next usage date plus usage interval 19 and amount remaining 21 to credit limit 20. The remote unit also records the cash withdrawal in a transaction file in remote unit memory and queries the customer whether or not he desires "Another Transaction?" on display panel 39.

If the customer selects a fund transfer while the system is off-line, the remote unit records the fund transfer in the amount entered by the customer using keyboard 38 in the transaction file in remote unit memory and queries the customer whether or not he desires "Another Transaction?" on display panel 39.

If the customer selects a deposit or payment while the system is off-line, the remote unit operates depository 33 to accept the deposit or payment; records the deposit or payment in the amount entered by the customer using keyboard 38 in the transaction file in remote unit memory; and queries the customer whether or not he desires "Another Transaction?" on display panel 39.

After the customer completes his transactions, the remote unit, in the event that the discretionary file contains card update data or in the event the customer performs a cash withdrawal, updates card 10 and returns it to the customer. The remote unit also prints a receipt for the customer's off-line transactions and dispenses it to the customer.

When a remote unit is in its on-line operational mode, the remote unit is responsive to polls from the central station. If the remote unit was previously in its off-line operational mode and during such time accumulated off-line transaction data, the remote unit when it goes on-line responds to the polls by transmitting the accumulated off-line transaction data in completion messages whose format will be described in greater detail below.

Briefly, each off-line transaction completion message includes, as shown in FIG. 9, a transacting customer's account number and suffix 401, a system utilization serial number 402, a date 403, a time 404, a bank code 405 which identifies the bank with which the customer maintains his accounts, a transaction identification 407$n$, a serial number 410$n$ which corresponds to the number printed on the customer's deposit or payment envelope in the case where the customer makes a deposit or payment and a transaction amount 411$n$. If the transacting customer performed more than one transaction, the off-line transaction completion message includes a plurality of transaction identifications 407$n$, serial numbers 410$n$ and transaction amounts 411$n$. The central unit is responsive to an off-line transaction completion message to account for the transactions which are reported therein, the accounting being performed in any desired, conventional manner.

If a customer inserts his card while the remote unit is in its on-line operational mode, the remote unit reads the card and checks the card data for parity. The remote unit checks bank code 15. The remote unit returns the card to the customer if bank code 15 does not appear in the bank code file in remote unit memory, thereby indicating that the card is not usable in the system. If bank code 15 does appear in the bank code file, the remote unit subsequently checks the card data against images in the duplicate card file in remote unit memory. A match indicates a fraud based on card duplication, and the remote unit captures the card. If there is no match, the remote unit then checks account number 13 and account suffix 16 against numbers in the discretionary file in remote unit memory. If this check produces a match, the remote unit determines from other data in the discretionary file what action to take. For example, if the data associated with the matching account number and account suffix in the discretionary file consists entirely of zeros, the remote unit captures the card, and, if the data is non-zero, the remote unit sets an update flag and later uses the discretionary file data as a source of updating information for the card. The remote unit checks credit limit 20 against the maximum credit limit which is associated with bank code 15. If the credit limit on the card exceeds the maximum credit limit for the bank, the remote unit captures the card. Otherwise the remote unit checks expiration date 14 and captures the card if it has expired.

If the card passes the above checks when the remote unit is in its on-line operational mode, the remote unit assembles a request message whose format will be described in greater detail below. Briefly, the request message includes, as shown in FIG. 7, a transacting customer's account number and suffix 301, a date 302, a time 303 and a bank code 304 which identifies the bank with which the customer maintains his accounts. The remote unit transmits the request message to the central station in response to a central station poll.

Referring to FIG. 1, central processing unit CPU in response to the request message searches an update file UF in central station memory which is associated with bank code 304 (FIG. 7) for account number and suffix 301 (FIG. 7) included in the request message to determine whether or not the card requires update. Central processing unit CPU also uses bank code 304 (FIG. 7) to address, or access, an algorithm in an algorithm file AF in central station memory and uses the algorithm to derive from the account number portion of account number and suffix 301 (FIG. 7) a number for comparison with the customer's PIN. Central processing unit CPU also searches a customer data file CDF in central station memory which is associated with bank code 304 (FIG. 7) and uses account number and suffix 301 (FIG. 7) to access the customer's account balances and other customer-related tabular information, such as the customer's credit profile.

Central processing unit CPU uses the customer's account balances and credit profile to compute a working balance, which comprises the amount of funds which the customer has available for on-line transactions, for each of the customer's credit-type accounts, such as his checking, savings and credit card accounts, it being noted here that the working balance for each of the customer's debit-type accounts, such as his mortgage and loan accounts, equals zero. Central processing unit CPU also uses the customer's account balances, including the account balances of both credit- and debit-type accounts, and credit profile to calculate an extended credit balance, i.e., a sum which extends a working balance when a customer transacts an on-line cash withdrawal. The purpose of the extended credit balance, to facilitate "split deposits" with little risk to the bank, will be discussed in greater detail below. Central processing unit CPU also uses the customer's account balances and credit profile to compute a maximum cash limit which prohibits the customer from withdrawing as cash more than a certain amount during any one use of the system while it is operating on-line. Central processing unit CPU uses bank code 304 (FIG. 7) to access an algorithm in algorithm file AF and uses the algorithm to calculate a line security code from date 302 and time 303 (FIG. 7) in the request message. Central processing unit CPU then assembles a reply message whose format will be described in greater detail below.

Briefly, the reply messages includes, as shown in FIGS. 8A and 8B, card update 351, 352, 353 and 354 for use interval 19, credit limit 20, expiration date 14 and control code 17, respectively, and/or line security code 357 which has been calculated by central processing unit CPU, a customer command 358 which instructs the remote unit to either (a) close out the customer and capture or return the customer's card, (b) process the customer's transactions off-line or (c) receive number 359 which has been calculated by central processing unit CPU for comparison with the customer's PIN, extended credit balance 362, maximum cash limit 364 and one or more account descriptions 366$n$, actual account balances 369$n$ and working balances 367$n$.

After central processing unit CPU assemblies the reply message, the central processing unit CPU polls the remote unit via master communication controller MCC. The poll queries the remote unit whether or not the remote unit is in condition to receive the reply message. The remote unit responds by transmitting an acknowledgement if it is in condition to receive the reply message. Master communication controller MCC then transmits the reply message to the remote unit.

The remote unit in response to the reply message uses bank code 15 to access an algorithm in remote unit memory and uses the algorithm to calculate from the same date and time data which the remote unit assembled in the request message a number for comparison with line security code 357 (FIG. 8B). If the number calculated by the remote unit matches line security code 357 (FIG. 8B) in the reply message, the remote unit proceeds to determine whether or not the reply message includes a number 359 for comparison with the customer's PIN. If the check of line security code 357 does not result in a match, the remote unit sets an off-line flag and proceeds in the off-line mode of operation.

Focusing here in the on-line mode of operation, if the reply message includes a number 359 (FIG. 8B) for comparison with the customer's PIN, the remote unit compares the PIN which the customer has entered with the number in reply message. If the reply does not include a number 359 (FIG. 8B), the remote unit compares the PIN which the customer has entered with a number which the remote unit has calculated from account number 13 using an algorithm which is associated with bank code 15. If a match results, the remote unit determines whether or not the reply message includes card update data and, if so, sets a card update flag. The remote unit then checks customer command 358 (FIG. 8B) in the reply message.

Assuming that the remote unit is instructed to proceed with on-line operation, the remote unit queries the customer whether or not he wants to know his actual account balances by displaying "Do You Wish Balance Inquiry?" on display panel 39. The customer responds "yes" or "no" using "Yes" and "No" keys 36. Alternatively, panel 30 may have a separate inquiry balance key. If the customer responds "yes" using "Yes" key 36 or depresses a separately provided balance inquiry key, the remote unit prints the customer's actual account balances 369n (FIG. 8B) in the reply message on a memorandum and dispenses it to the customer through printer slot 42. The remote unit then queries the customer whether or not he wishes "Another Transaction?" on display panel 39. The customer again responds "yes" or "no" using "Yes" and "No" keys 36.

Assuming that the customer has rejected a balance inquiry or that after a balance inquiry he wishes a transaction involving funds in one or more of his accounts, the remote unit enables certain transaction selector keys 31 for customer selection depending on the account descriptions 366n (FIG. 8B) in the reply message. The remote unit instructs the customer to (a) "Select Transaction" and, after the customer selects a transaction using transaction selector keys 31, (b) "Enter Amount" on display panel 39.

Once the customer selects a transaction using one of the transaction selector keys 31 and enters a transaction amount using either amount selector keys 37 or keyboard 38, the remote unit proceeds to determine what type of transaction the customer has selected. The transaction falls into one of three categories; that is, each transaction is (a) a cash withdrawal, (b) a fund transfer or (c) a deposit or payment.

If the customer selects a cash withdrawal while the system is on-line, the remote unit determines from the transaction selector key 31 which the customer selects and the account descriptions 366n (FIG. 8B) in the reply message whether or not the customer has several accounts which can serve as the debit account. For example, the customer may have selected a cash withdrawal from savings account, and he has several savings accounts. In this multiple account situation, the remote unit instructs the customer to "Enter 'From' Account Suffix Code." When so instructed, the customer enters a predetermined numerical designation, such as "02", to specify the debit account. After the remote unit determines which account is the debit account, it compares the amount entered by the customer using amount selector keys 37 (FIG. 3) with working balance 367n (FIG. 8B) for the debit account. If the amount entered by the customer exceeds the working balance for the debit account, the remote unit adds extended credit balance 362 (FIG. 8B) in the reply to the working balance for the debit account and compares the amount entered by the customer against the sum. If the amount entered by the customer exceeds the sum of the working balance for the debit account plus the extended credit balance, the remote unit changes the amount entered by the customer so that it equals the sum of the working balance for the debit account plus the extended credit balance.

Thereafter, the remote unit adds the original amount entered by the customer, or as changed to the sum of the working balance for the debit account plus the extended credit balance, to the previous total of the customer's cash withdrawals since he inserted his card, i.e., since he most recently commenced use of the system. If the total exceeds maximum cash limit 364 (FIG. 8B) included in the reply, the remote unit first responds "Limit Exceeded" and then queries the customer whether or not he desires "Another Transaction?" on display panel 39. If the maximum cash limit is not exceeded, the remote unit dispenses cash to the customer in the amount entered by the customer, or as changed to the sum of the working balance for the debit account plus the extended credit balance; debits the working balance for the debit account by the amount dispensed to the customer or debits the working balance to zero and the extended credit balance by the amount by which the amount dispensed to the customer exceess the working balance for the debit account; adds the amount dispensed to the customer to the previous total of the customer's cash withdrawals since he inserted his card; records the cash withdrawal in a transaction file in remote unit memory; and queries the customer whether or not he desires "Another Transaction?" on display panel 39.

If the customer selects a fund transfer while the system is on-line, the remote unit determines from the transaction selector key 31 which the customer selects and the account descriptions 366n (FIG. 8B) in the reply message whether or not the customer has several accounts which can serve as the debit account, i.e., whether or not the selected one of transaction selector keys 31 and account descriptions 366n (FIG. 8B) indicate that funds are to be transferred from one of multiple accounts. Similarly, the remote unit determines from the transaction selector key 31 which the customer selects and the account descriptions 366n (FIG. 8B) in the reply message whether or not the customer has several accounts which can serve as the credit account, i.e., whether or not the selected one of transaction selector keys 31 and account descriptions 366n (FIG. 8B) indicate that funds are to be transferred to one of multiple accounts. For example, the customer may have selected a transfer from savings to checking accounts, and he has several savings and several checking accounts. In this multiple account situation, the remote unit (a) instructs the customer to "Enter 'From' Account Suffix Code" and (b) instructs the customer to "Enter 'To' Account Suffix Code." When so instructed, the customer enters predetermined numerical designations, such as "01" and "04," to designate the debit and credit accounts, respectively.

After the remote unit determines which account is the debit account and which account is the credit account, it compares the amount entered by the customer using keyboard 38 with the working balance 367n (FIG. 8B) for the debit account. If the amount entered by the customer exceeds the working balance, the remote unit denies the fund transfer. The remote unit then queries the customer whether or not he desires "Another Transaction?" on display panel 39. If the amount entered by the customer does not exceed the working balance, the remote unit debits the working balance for the debit account; records the fund transfer in the transaction file in remote unit memory; and queries the customer whether or not he desires "Another Transaction?" on display panel 39.

If the customer selects a deposit or payment while the system is on-line using deposit/payment key 32, the remote unit operates depository 33 to accept the deposit or payment; records the deposit or payment in the amount entered by the customer using keyboard 38 in the transaction file in remote unit memory; and queries the customer whether or not he desires "Another Transaction?" on display panel 39.

In summary of the on-line transaction sequence, the remote unit queries the customer whether or not he desires to review his actual account balances prior to withdrawing cash, transferring funds or making deposits or payments. If he does, the remote unit prints the customer's actual account balances 369n (FIG. 8B) on a memorandum and dispenses it to the customer. The remote unit then determines from account descriptions 366n (FIG. 8B) in the reply which transactions the customer may perform and enables certain transaction selector keys 31 accordingly. The remote unit then determines from the enabled transaction selector key 31 which the customer selects and the account descriptions 366n (FIG. 8B) in the reply whether or not multiple debit accounts are involved in the case of a cash withdrawal or multiple debit and/or credit accounts are involved in the case of a fund transfer. If multiple accounts are involved, the remote unit instructs the customer to enter predetermined numerical designations before proceeding.

The remote unit processes and authorizes or denies the transaction which the customer selects. It uses working balance 367n for the debit account, extended credit balance 362 and maximum cash limit 364 (FIG. 8B) in the reply to process a cash withdrawal. It uses the working balance 367n (FIG. 8B) in the reply to process a fund transfer. Thus, the burden of processing and authorizing or denying customer transactions, such as cash withdrawals and fund transfers, rests with the remote unit. The remote unit operates the depository 33 to accept a deposit or payment.

After each transaction, regardless of whether it is authorized or denied, the remote unit queries the customer whether or not he wants another transaction. This permits the customer to transact a series of transactions, including cash withdrawals, fund transfers and deposits and payments, pursuant to a single insertion of his card. In addition, the remote unit processes and authorized or denies additional transactions in the series without any further communication with the central station.

After the customer completes his transactions, the remote unit, in the event that the discretionary file contains card update data or in the event the reply message includes card update data, updates card 10 and returns it to the customer. The remote unit also prints a receipt for the customer's on-line transactions and dispenses it to the customer.

The remote unit then assembles an on-line transaction completion message which includes the same data as the off-line transaction completion message which has been discussed above, but the on-line completion message also includes predetermined numerical designations 408n (FIG. 9) for "From" accounts and 409n (FIG. 9) for "To" accounts if multiple accounts are involved.

The remote unit transmits the on-line completion message to the central station. The central unit is responsive to the on-line completion message to account for the on-line transactions reported therein.

DETAILED DESCRIPTION OF SYSTEM AND OPERATION

Figure 5A:
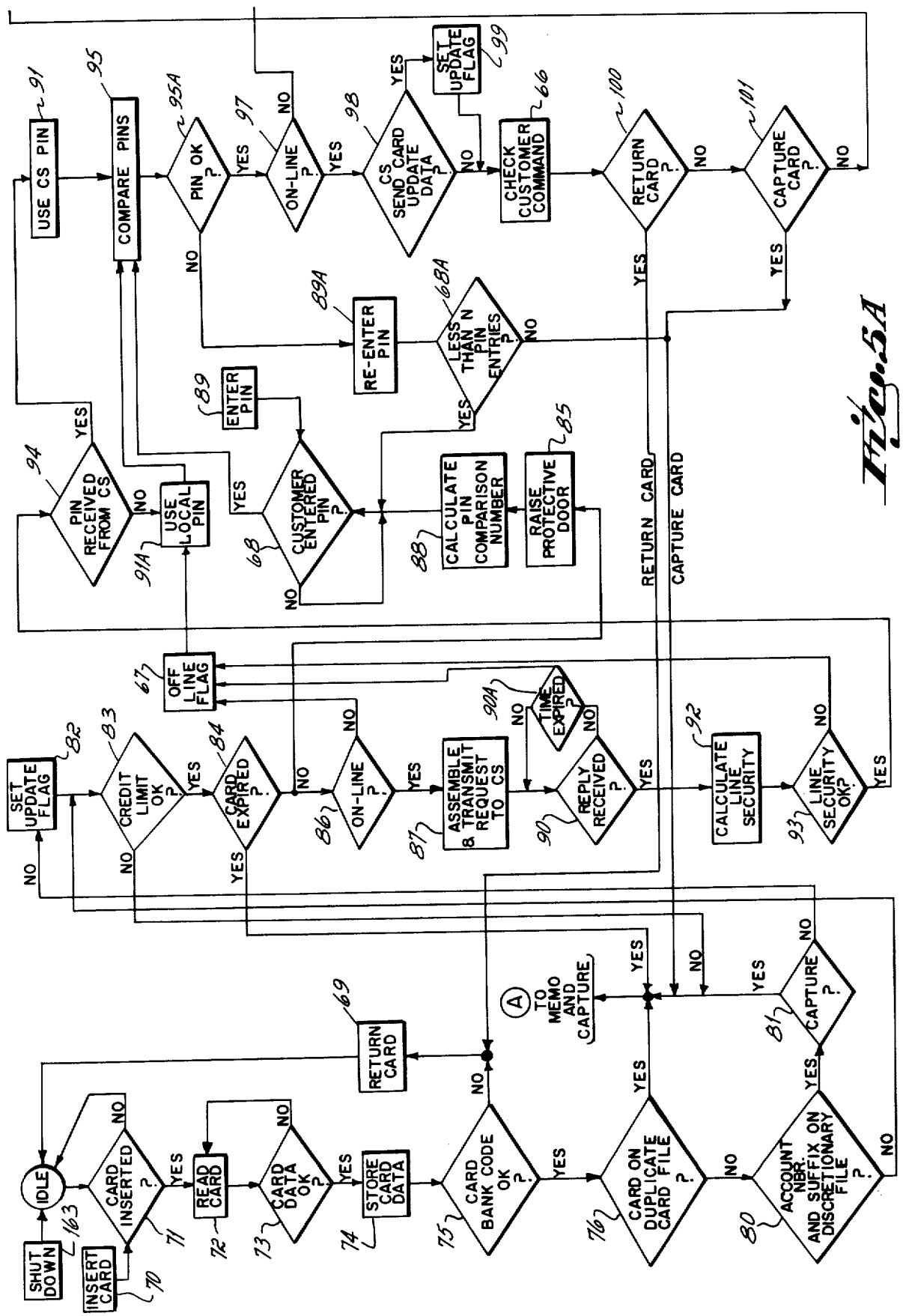
FIG. 5, comprising FIGS. 5A through 5C connected as shown, is a flow diagram which illustrates the operational steps of the remote unit.

Operation of the on-line/off-line automated banking system of the present invention will be better understood by reference jointly to the panel drawing of FIG. 3 and the flow diagram of FIG. 5.

Card Reading

Initially, protective door 45 is closed to conceal transaction selector keys 31, depository 33, "Yes" and "No" keys 36, keyboard 38, display panel 39, cash amount selector keys 37, cash slot 40 and printer slot 42, and remote unit 60 is idle. A customer inserts card 10 (FIG. 12) into card reader/writer 43 as indicated by customer function 70. The customer activates card reader/writer 43 when he inserts his card. Remote unit 60 senses the actuation of card reader/writer 43 and exists its idle condition as indicated by machine function 71.

Figure 6A:
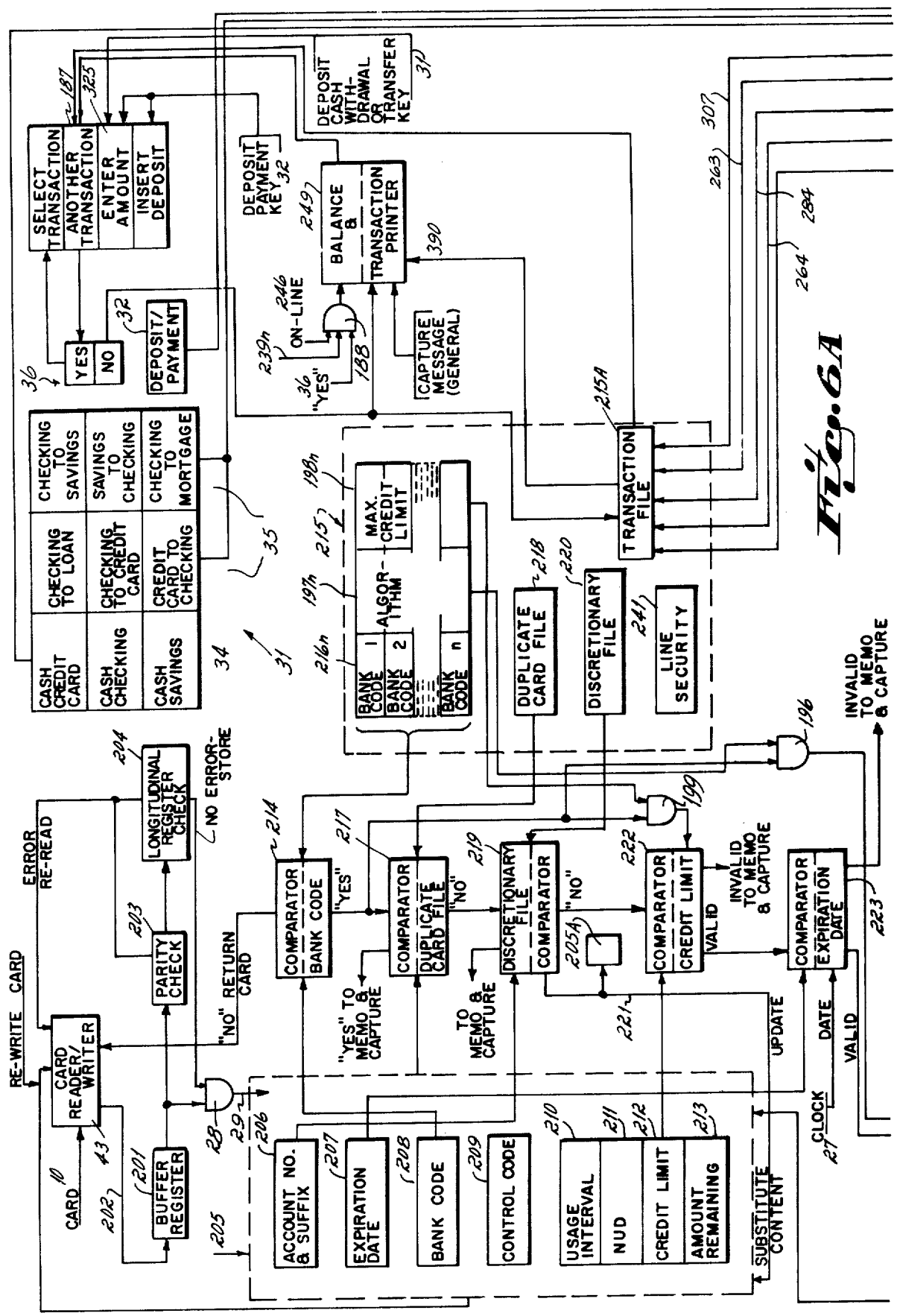
FIG. 6, comprising FIGS. 6A through 6D connected as shown, is a block diagram of a construction for the remote unit for performing the operational steps which are depicted in FIG. 5.
Figure 6A:
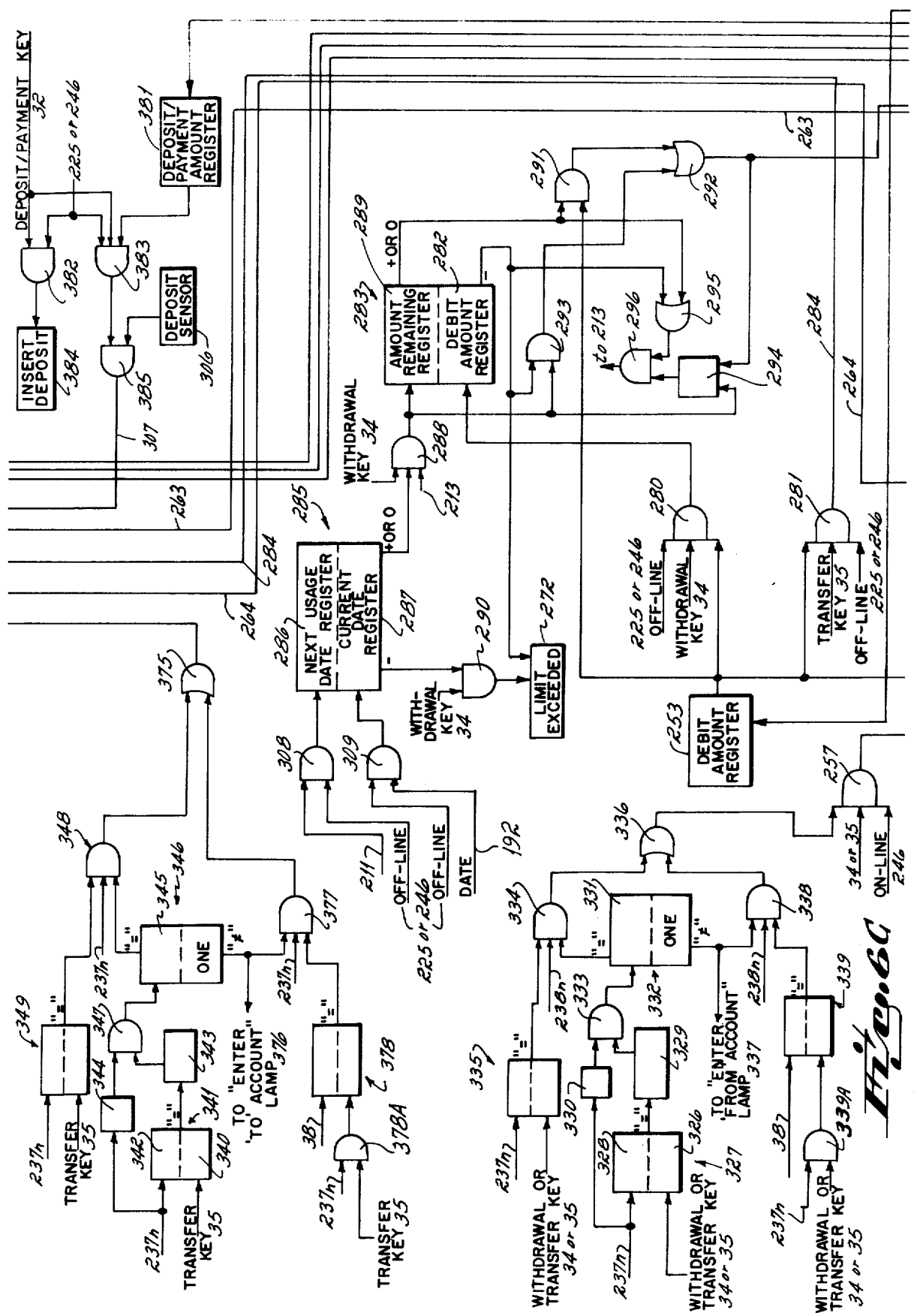

Card reader/writer 43 reads card 10 (FIG. 2) as indicated by machine function 72. FIG. 6 shows the card reading operation in greater detail. The customer inserts card 10 in card reader/writer 43. Card reader/writer 43 reads card 10 and enters data from card 10 into buffer register 201 via ata line 202.

Card Data Checking and Storage

Referring again to FIGS. 3 and 5, remote unit 60 conducts checks on data which card reader/writer 43 reads from card 10 (FIG. 2) as indicated by machine function 73. The checks comprise parity and longitudinal register check (LRC) operations which are indicated in FIG. 6 at 203 and 204, respectively. Thus, remote unit 60 first checks data in buffer register 201 to determine whether or not its vertical bit format is correct. Second, remote unit 60 checks data in buffer register 201 to determine whether or not its horizontal bit format is correct. Of course, different data checks could be used as substitutes and/or supplements.

Returning to FIG. 5, if machine function 73 indicates that the data format is incorrect, card reader/writer 43 re-reads card 10 as remote unit 60 returns to machine function 72. If machine function 73 indicates that the data format is correct, the data from card 10 is transcribed into remote unit 60 memory as indicated by machine function 74. Referring to FIG. 6, if the data format is correct, a signal from longitudinal register check 204 gates data in buffer register 201 to remote unit 60 memory 205 via AND gate 28 and data line 29. Data from buffer register 201 which enters remote unit 60 memory 205 includes account number 13 and account suffix 16, expiration date 14, bank code 15, control code 17, usage interval 19, next usage date (NUD) 18, credit limit 20 and amount remaining 21, which enter registers 206 through 213, respectively.

Bank Code Check

Referring again to FIG. 5, after data on card 10 (FIG. 2) is stored in remote unit 60 memory, remote unit 60 checks bank code 15 (FIG. 2) to determine whether or not the card is usable in the system as indicated by machine function 75. Referring to FIG. 6, the bank code check operation entails a comparison by bank code comparator 214 of data in bank code register 208 read from the card with a file of recognized bank codes in registers $216_1, \ldots, 216_n$ in remote unit 60 memory 215. Returning to FIG. 5, if bank code 15 (FIG. 2) does not appear in the file of recognized bank codes in remote unit 60 memory, card 10 is returned to the customer as indicated by machine function 69, and remote unit 60 returns to its idle condition.

Duplicate Card Check

If bank code 15 appears on the file of recognized bank codes, remote unit 60 conducts a search of a duplicate card file in remote unit 60 memory as indicated by machine function 76. FIG. 6 shows the duplicate card check operation in greater detail. Duplicate card file comparator 217 compares data in memory 205 with data in duplicate card file 218 in remote unit 60 memory 215. Duplicate card file 218 comprises images of the cards inserted in the most recent, for example, 100 off-line cash withdrawal transactions, the image being that of the inserted card before the cash withdrawal occurs and the card updated to reflect the transaction. Referring again to FIGS. 3 and 5, if an identical image of card 10 appears in the duplicate card file, which can only occur if a card is duplicated and, hence, is fraudulent, remote unit 60 prints a memorandum indicating the card appears in the duplicate card file and dispenses it to the customer through printer slot 42 and captures card 10 as indicated by machine functions 77, 78 and 79, respectively.

Discretionary File Check: Card Capture and Update

If the image of card 10 does not appear in the duplicate card file, remote unit 60 searches a discretionary file for account number 13 and suffix 16 as indicated by machine function 80. The discretionary file contains, for example, the account number and suffix of cards which have been reported lost or stolen and should be captured, as well as cards which are designated for update of the information thereon. Referring to FIG. 6, the discretionary file check operation entails a comparison by discretionary file comparator 219 of data in account number and suffix register 206 read from the card with account numbers and suffixes in discretionary file 220 in remote unit 60 memory 215.

Returning to FIG. 5, if machine function 80 indicates that the account number and suffix appear in the discretionary file, remote unit 60 determines whether or not the discretionary file commands capture, for example, a stolen card, as indicated by machine function 81. If machine function 81 indicates that the discretionary file commands card capture, remote unit 60 prints a memorandum indicating the card is designated for capture and dispenses it to the customer and captures card 10 as indicated by machine functions 77, 78 and 79, respectively. If machine function 81 indicates that the discretionary file does not command card capture, remote unit 60 sets an update flag as indicated by machine function 82.

More particularly, and as shown in FIG. 6, if discretionary file comparator 219 indicates that data in account number and suffix register 206 appears in discretionary file 220, remote unit 60 checks the data in discretionary file 220 which is associated with the matching account number and suffix in discretionary file 220. If the associated discretionary file data comprises, for example, zeros, card capture is commanded. If the associated discretionary file data comprises partially non-zero data, remote unit 60 rewrites memory 205 in accordance therewith, effectively updating the card data as stored in memory 205 in accordance with the data in the discretionary file. Stated differently, the data in discretionary file 200 replaces the corresponding card data in memory 205, this being accomplished via data line 221, thereby updating the card data in memory 205. If the discretionary file contains update data, remote unit 60 also causes a bi-stable device, or flip-flop, 205A to assume a state which indicates that card 10 should be re-written.

Credit Limit Check

Referring again to FIG. 5, if the account number and suffix read from the card do not appear in the discretionary file or after remote unit 60 sets the update flag as indicated by machine function 82, remote unit 60 checks credit limit 20 (FIG. 2) to determine whether or not the credit limit on the card exceeds a predetermined credit limit established by the customer's bank as indicated by machine function 83. Referring to FIG. 6, the credit limit check operation entails a comparison by credit limit comparator 222 of data in credit limit register 212 with the predetermined maximum, or ceiling, credit limit in maximum credit limit register $198_n$ which bank code comparator 214 gates to comparator 222 via AND gate 199 when bank code comparator 214 indicates a match between data in bank code register 208 and the bank code $216_n$ associated with the maximum credit limit register $198_n$.

Referring to FIG. 5, if machine function 83 indicates that the credit limit on the card exceeds the maximum credit limit for the customer's bank, remote unit 60 prints a memorandum indicating an invalid credit limit and dispenses it to the customer and captures the card 10 as indicated by machine functions 77, 78 and 79, respectively.

Expiration Date Check

If machine function 83 indicates that the credit limit on the card does not exceed the maximum credit limit for the customer's bank, remote unit 60 checks expiration date 14 (FIG. 2) to determine whether or not card 10 has expired as indicated by machine function 84. FIG. 6 shows that a clock 27 in remote unit 60 supplies date information to expiration date comparator 223 compares the date supplied by clock 27 with data in expiration date register 207 read from the card.

Returning to FIG. 5, if machine function 84 indicates that card 10 has expired, remote unit 60 prints a memorandum indicating card expiration and dispenses it to the customer and captures card 10 as indicated by machine functions 77, 78 and 79, respectively. If machine function 84 indicates that card 10 has not expired, remote unit 60 raises protective door 45 as indicated by machine function 85. FIG. 6 shows the protective door raising operation at 224. Remote unit 60 also determines whether it is operating in an on-line mode or an off-line mode as indicated by machine function 86 in FIG. 5. FIG. 6 shows the on-line/off-line status checking operation at 225. The status checking operation entails a check of a flip-flop 225A which in one condition indicates that the remote unit is operating in an on-line mode and which in another condition indicates that the remote unit is operating in an off-line mode.

On-Line Mode

Request Message

An advantage of the system of the present invention is that only after the preceding checks have been successfully conducted and if machine function 86 in FIG. 5 indicates on-line mode operation does remote unit 60 prepare a request message and transmit the request message to central station CS (FIG. 1) as indicated by machine function 87. FIG. 6 shows assembly and transmission of the request message at 226 in response to an indication from on-line/off-line status check 225 that remote unit 60 is operating in an on-line mode. Clock 27 in remote unit 60 supplies date and time information, and memory 205 supplies date in account number and suffix register 206 and bank code register 208 to assembler/transmitter 226. Also, the date is transcribed into date register 192, and the time is transcribed into time register 193 for purposes which are described in greater detail below.

FIG. 7 shows the format of the request message. The request message includes four-character request message sentinel 300; 20-character account number and suffix register 206 (FIG. 6) and leading zeros; six-character date 302 which comprises two characters for month, two characters for day and two characters for year; four-character time 303 which comprises two characters for hour and two characters for minute; eight-character bank code 304 which comprises data in bank code register 208 (FIG. 6) and leading zeros; and one-character new line code 305. The request message may also include other information, such as data read from card 10 including the usage interval, expiration date, control code and credit limit, for purposes which will be described hereinafter in connection with a "mixed" on-line/off-line mode of operation.

Cardholder Verification

Referring again to FIG. 5, remote unit 60 preferably also verifies that the cardholder is properly in possession of the card. Specifically, remote unit 60 calculates a PIN comparison number by operation on account number 13 in accordance with an algorithm such as described in Spetz, "Verification System," U.S. Pat. No. 3,794,813, which is incorporated by reference herein, as indicated by machine function 88. FIG. 6 shows calculation of the PIN comparison number at 227. Remote unit 60 uses an algorithm which is associated with the customer's bank. Bank code comparator 214 gates the algorithm in algorithm register $197_n$ to PIN comparison number calculator 227 via AND gate 196 when bank code comparator 214 indicates a match between data in bank code register 208 and the bank code $216_n$ associated with the algorithm register $197_n$. The algorithm then operates on the account number in account number and suffix register 206 in accordance with, for example, Spetz, supra. Remote unit 60 enters the PIN comparison number thus calculated into remote unit PIN comparison number register 228. Remote unit 60 also displays "Enter Memorized Number" on display panel 39 as indicated by machine function 229 in FIG. 6.

Returning to FIG. 5, the customer enters his memorized PIN using keyboard 38 as indicated by customer function 89. Remote unit 60 senses entry of the customer's memorized PIN as indicated by machine function 68. As shown in FIG. 6, if on-line/off-line status check 225 indicates on-line mode operation, remote unit 60 may display "Please Wait" on display panel 39 as indicated at 194 if a reply message which will be described in detail below is not immediately made available to remote unit 60 by central station CS (FIG. 1).

Reply Message

While remote unit 60 calculates the PIN comparison number, central station CS processes the request message. Referring to FIG. 1, central processing unit CPU in response to the request message searches an update file UF in central station memory which is associated with bank code 304 (FIG. 7) for account number and suffix 301 (FIG. 7) included in the request message to determine whether or not the card requires update. Central processing unit CPU also uses bank code 304 (FIG. 7) to address, or access, an algorithm in an algorithm file AF in central station memory and uses the algorithm to derive from the account number portion of account number and suffix 301 (FIG. 7) a number for comparison with the customer's PIN. Central processing unit CPU also searches a customer data file CDF in central station memory which is associated with bank code 304 (FIG. 7) and uses account number and suffix 301 (FIG. 7) to access the customer's account balances and other customer-related tabular information, such as the customer's credit profile.

Central processing unit CPU uses the customer's account balances and credit profile to compute a working balance, which comprises the amount of funds which the customer has available for on-line transactions, for each of the customer's credit-type accounts, such as his checking, savings and credit card accounts, it being noted here that the working balance for each of the customer's debit-type accounts, such as his mortgage and loan accounts, equals zero. Central processing unit CPU also uses the customer's account balances, including the account balances of both credit- and debit-type accounts, and credit profile to calculate an extended credit balance, i.e., a sum which extends a working balance when a customer transacts an on-line cash withdrawal. The purpose of the extended credit balance, to facilitate "split deposits" with little risk to the bank, will be discussed in greater detail below. Central processing unit CPU also uses the customer's account balances and credit profile to compute a maximum cash limit which prohibits the customer from withdrawing as cash more than a certain amount during any one use of the system while it is operating on-line. Central processing unit CPU uses bank code 304 to access an algorithm in algorithm file AF and uses the algorithm to calculate a line security code from date 302 and time 303 (FIG. 7) in the request message.

FIG. 8 shows that the reply message is a one part or two part message. If central station CS (FIG. 1) transmits card update data, the reply message is a two-part message, including parts I and II. FIG. 8A illustrates that part I comprises card update data and FIG. 8B illustrates that part II comprises either a short customer command or normal customer account data. If central station CS (FIG. 1) does not transmit a reply message having card update data, FIG. 8B shows that the reply message comprises either a shot customer command or normal customer account data.

When central station CS (FIG. 1) transmits card update data, FIG. 8A illustrates that the reply message includes three-character card update sentinel 350; one-character usage interval update data 351; two-character credit limit update data 352; four-character expiration date update data 353 which comprises two characters for month and two characters for year; two-character control code update data 354; and one-character new line code 355. Whether or not central station CS (FIG. 1) transmits card update data, FIG. 8B illustrates that the reply message includes three-character reply message sentinel 356; four character line security code 357; one-character customer command 358, which comprises either "0" which commands remote unit 60 to continue the normal on-line mode of operation, "1" which commands remote unit 60 to capture card 10, "2" which commands remote unit 60 to enter the off-line mode of operation or "3" which commands remote unit 60 to enter a customer close out sequence and return card 10; four-character number 359 for comparison with the customer's PIN; and one character new line code 360. If customer command 358 is "0", new line code 360 is followed by four-character extended credit/maximum cash limit sentinel 361; six-character extended credit balance 362, which comprises four characters for dollars and two characters for cents; one-character comma 363, which serves as a separator; seven-character maximum cash limit 364, which comprises five characters for dollars and two characters for cents; and one-character new line code 365. New line code 365 is followed by one or more groups of data. Each group of data includes four-character account description 366$_n$, which comprises two characters for account type and two characters for account type suffix; six-character working balance 367$_n$, which comprises four characters for dollars and two characters for cents; one-character comma 368$_n$, which serves as a separator; seven-character inquiry balance 369$_n$, which comprises five characters for dollars and two characters for cents; and one-character new line code 370$_n$.

Referring to FIG. 5, remote unit 60 determines whether or not a reply message has been received from central station CS (FIG. 1) as indicated by machine function 90. If machine function 90 indicates that a reply message has not been received, remote unit 60 determines the amount of time which has elapsed since it transmitted the request message as indicated by machine function 90A. Remote unit 60 computes the difference between the current time in clock 27 (FIG. 6) and the time at which the request message was transmitted in time register 193 (FIG. 6). If the time difference exceeds a predetermined amount of time, such as 24 seconds, remote unit 60 proceeds to machine function 67, thereby initiating the off-line mode of operation.

If machine function 90A indicates that the predetermined amount of time has not expired, remote unit 60 continues to activate the "Please Wait" lamp on display panel 39 (FIG. 3) and to await the reply message until the predetermined amount of time expires. If machine function 90 indicates that a reply message has been received, remote unit 60 stores the reply message data in its memory. As shown in FIG. 6, the remote unit 60 receives the reply message from central station CS (FIG. 1) and stores the data in the reply message in remote unit memory 230. Data in update register 231 includes usage interval update data 351 (FIG. 8A), credit limit update 352, expiration date update data 353 and control code update data 354. Line security code 357 (FIG. 8B), customer command 358, number 359 for comparison with the customer's PIN, extended credit balance 362 and maximum cash limit 364 enter registers 232 through 236, respectively. Account description 366$_n$, working balance 367$_n$ and inquiry balance 369$_n$ enter registers 237$_n$, 238$_n$ and 239$_n$, respectively.

Line Security Check

Returning to FIG. 5, when remote unit 60 receives the reply message, remote unit 60 calculates a number for comparison with the line security code as indicated by machine function 92 using the same algorithm to calculate the number as central station CS (FIG. 1) employed to calculate the line security code. Moreover, remote unit 60 uses date and time data, which corresponds to date 302 and time 303 in the request message, in its calculations. Remote unit 60 then compares the line security code in the reply message from central station CS (FIG. 1) with the number which it has calculated as indicated by machine function 93. Referring to FIG. 6, line security generator 240 calculates a number using an algorithm 241 in remote unit memory 215 which corresponds to the one which central station CS (FIG. 1) used to calculate line security code 357 (FIG. 8B). Remote unit 60 uses date and time data in date and time registers 192 and 193, the same date and time data which remote unit 60 transmitted in the request message. The line security check operation entails a comparison by line security comparator 242 of the number in line security generator 240 with data in line security code register 232.

PIN Check

Referring again to FIG. 5, if the line security code in the reply message and the number which remote unit 60 calculates for comparison with the line security code are identical, remote unit 60 determines whether or not central station CS (FIG. 1) has included a number for comparison with the customer's PIN within the reply message as indicated by machine function 94. If machine function 94 indicates that the reply message included a number for comparison with the customer's PIN, remote unit 60 uses the number in the reply message for the comparison as indicated by machine function 95. On the other hand, remote unit 60 uses the number which it calculated at machine function 88 for the comparison as indicated by machine function 95, (a) if machine function 86 indicates that remote unit 60 is operating in the off-line mode, and remote unit 60 has set the off-line mode flag as indicated by machine function 67; or (b) if machine function 93 indicates that the line security code in the reply message and the number which remote unit 60 calculates for comparison with the line security code differ, and remote unit 60 has set the off-line mode flag as indicated by machine function 67; or (c) if central station CS (FIG. 1) did not include a number for comparison with the customer's PIN within the reply message. Thus, if the reply message included a number for comparison with the customer's PIN and the line security check was favorable, remote unit 60 uses the number in the reply message as indicated by machine function 91. If remote unit 60 is operating off-line, if the line security check was unfavorable or if the reply message did not include a number for comparison with the customer's PIN, remote unit 60 uses the number calculated at machine function 88 as indicated by machine function 91A.

Referring to FIG. 6, if the reply message included number 359 for comparison with the customer's PIN (FIG. 8B), a signal that remote unit 60 is operating on-line from status check 225 gates data in number register 234 to selector 243 via AND gate 191. Otherwise, data in selector 243 is the same as data in PIN comparison number register 228. PIN comparator 244 then compares data in selector 243 with the customer's memorized PIN in memorized PIN register 245, which the customer entered using keyboard 38.

Returning to FIG. 5, if machine function 95A indicates that the centrally or remotely calculated number and the customer's memorized PIN are not identical, remote unit 60 instructs the customer to re-enter his memorized PIN as indicated by customer function 89A. Preferably, remote unit 60 checks whether or not the customer has attempted to enter a memorized PIN more than a predetermined number of times, such as three, as indicated by machine function 68A. If machine function 68A indicates that the customer fails to enter the required PIN within a certain number of attempts, remote unit 60 prints a memorandum indicting failure to enter a correct PIN and dispenses it to the customer and captures the card as indicated by machine functions 77, 78 and 79, respectively.

On-Line Update

If machine function 95A indicates that the centrally or remotely calculated number and the customer's memorized PIN are identical, indicating the cardholder is in proper possession of the card, remote unit 60 again determines whether it is operating in the on-line mode or the off-line mode as indicated by machine function 97. If it is operating in the on-line mode, remote unit 60 determines whether or not central station CS (FIG. 1) included any card update data within the reply message as indicated by machine function 98. If machine function 98 indicates that the reply message included card update data, remote unit 60 sets an update flag as indicated by machine function 99. Referring to FIG. 6, remote unit 60 rewrites memory 205 in accordance with data in update register 231, effectively updating the card data as stored in memory 205 in accordance with update data received in the reply message from central station CS (FIG. 1). Stated differently, data in update register 231 replaces the corresponding card data in memory 205, this being accomplished via data line 221A, thereby updating the card data in memory 205. Data in update register 231 causes flip-flop 205A to assume a state which indicates that card 10 must be re-written.

Customer Command

If machine function 98 indicates that the reply message included no card update data or after remote unit 60 sets the update flag at machine function 99, remote unit 60 checks the customer command in the reply message as indicated by machine function 66. Remote unit 60 determines from the customer command in the reply message whether it should return or capture card 10 as indicated by machine functions 100 and 101, respectively, or whether it should proceed in the off-line mode or the on-line mode as indicated by machine functions 102 and 103, respectively. Referring to FIG. 6, remote unit 60 accesses data in customer command register 233 and enters it in customer command temporary register 246 where remote unit 60 checks the customer command character.

Referring again to FIG. 5, if machine function 100 indicates card return, card 10 is returned to the customer as indicated by machine function 69. If machine function 101 indicates card capture, remote unit 60 prints a memorandum indicating card capture and dispenses it to the customer and captures card 10 as indicated by machine functions 77, 78 and 79, respectively.

Balance Inquiry

If machine function 103 indicates that remote unit 60 is operating in the on-line mode and if the reply message included inquiry balances, remote unit 60 queries the customer whether or not he desires an inquiry balance transaction as indicated by machine function 110. Referring to FIG. 6, data in inquiry balance registers $239_n$ gates a signal that remote unit 60 is operating on-line from customer command temporary register 246 via AND gate 189 to activate "Do You Wish Balance Inquiry?" lamp 190 on display panel 39.

Returning to FIG. 5, the customer enters "yes" or "no" using "Yes" and "No" keys 36 as indicated by customer function 65. If machine function 110 indicates that the customer selected a balance inquiry transaction, remote unit 60 prints a memorandum which includes the inquiry balances in the reply message, which are the customer's actual account balances, and dispenses the memorandum to the customer as indicated by machine functions 111 and 112, respectively. FIG. 6 illustrates that, if the customer responds "yes" to the balance inquiry query, a signal from "Yes" key 36 and a signal that remote unit 60 is operating on-line from customer command temporary register 246 gate data in inquiry balance registers $239_n$ to printer 249 via AND gate 188. Printer 249 prints data in inquiry balance registers $239_n$ on a slip of paper and dispenses the printed slip to the customer.

Thereafter, remote unit 60 queries the customer to determine whether or not he desires an additional transaction as indicated by machine function 113. As shown in FIG. 6, printer 249 activates "Another Transaction?" lamp 187 on display panel 39.

Referring again to FIG. 5, the customer enters "yes" or "no" using "Yes" and "No" keys 36 (FIG. 3) as indicated by customer function 114. If the customer responds by depressing "No" key 36, remote unit 60 proceeds to the customer close out sequence which will be described below.

Enabling Certain Transactions Available to Customer On-Line

If the customer responds by depressing "Yes" key 36 or if machine function 110 indicates that the customer has not selected a balance inquiry transaction, remote unit 60 derives a set of enabling signals for particular transaction selector keys 31 (FIG. 3) from the account descriptions in the reply message as indicated by machine function 104. As shown in FIG. 6, a signal from customer command temporary register 246 that remote unit 60 should proceed on-line gates data in account description registers 237$_n$ through AND gate 247 to control table 248. Control code table 248 translates data in account description registers 237$_n$ into an array of enabling signals for transaction selector keys 31. The customer can then select an on-line transaction as will be described in greater detail below.

Off-Line

If machine function 97, 102, or 103 indicates that remote unit 60 should proceed in the off-line mode, remote unit 60 derives a set of enabling signals for particular transaction selector keys 31 (FIG. 3) from the control code read from the card as indicated by machine function 105. Referring to FIG. 6, in the first instance a signal from status check 225 that remote unit 60 is operating off-line via OR gate 26 gates data in control code register 209 through AND gate 25 to control table 248. In the second instance a signal from customer command temporary register 246 that remote unit 60 should proceed off-line via OR gate 26 gates data in control code register 209 through AND gate 25 to control table 248. In either instance control code table 248 translates data in control code register 209 into an array of enabling signals for transaction selector keys 31. The customer can then select an off-line transaction as will be described in greater detail below.

Referring to FIG. 5, remote unit 60 enables certain transaction selector keys 31 in accordance with the array of enabling signals as indicated by machine function 107. Remote unit 60 also uses the array of enabling signals to write a header in transaction file 215A (FIG. 6) for recording ensuing transactions under the proper transaction designation as indicated by machine function 106. Thus, for example, when the customer selects a cash withdrawal from his savings account, his transaction will be recorded in transaction file 215A (FIG. 6) under the heading which indicates a cash withdrawal from savings account transaction. As shown in FIG. 6, control table 248 activates "Select Transaction" lamp 191 on display panel 39, as well as enables particular transaction selector keys 31 and writes a header in transaction file 215A.

In order to facilitate understanding of the transaction sequence as executed by remote unit 60, reference will first be made to the flow diagram of FIG. 5.

Remote unit 60 identifies transactions which are available to the customer by enabling certain transaction selector keys 31 as indicated by machine function 107. The customer selects a transaction as indicated by customer function 108. Remote unit 60 senses the customer's selection of a transaction as indicated by machine function 109. The customer then enters a transaction amount as indicated by customer function 115. After remote unit 60 senses that the customer has entered a transaction amount as indicated by machine function 116, remote unit 60 determines whether or not the customer has selected a cash withdrawal as indicated by machine function 117.

Cash Withdrawal

If machine function 117 indicates that the customer has selected a cash withdrawal, remote unit 60 determines whether the cash withdrawal should be processed (a) in accordance with data in a reply message or (b) in accordance with data read from card 10 (FIG. 2) and updated at machine function 81, if applicable, as indicated by machine function 118. I.e., remote unit 60 determines at machine function 118 whether it is operating in the on-line mode or the off-line mode.

On-Line

If machine function 118 indicates that data in a reply message should be used to process the cash withdrawal, remote unit 60 checks the account descriptions in the reply message and determines whether or not more than one account can serve as the debit account for the cash withdrawal as indicated by machine function 63. That is, if the customer has selected a cash withdrawal from his savings account, for example, remote unit 60 determines whether or not the reply message included data for more than one savings account, any one of which could serve as the debit account. If machine function 64 indicates the presence of more than one possible debit account, the customer must enter a predetermined numerical designation using keyboard 38 to designate which one of the possible debit accounts he wants to use for the cash withdrawal as indicated by customer function 62. Remote unit 60 senses the customer's entry of a predetermined numerical designation for a debit account as indicated by machine function 61.

If machine function 64 indicates that there is only one possible debit account or after machine function 61 indicates that the customer has entered a predetermined numerical designation to designate one of several accounts as the debit account for the cash withdrawal, remote unit 60 compares the working balance for the debit account with the amount entered by the customer at customer function 115 as indicated by machine function 119. If machine function 120 indicates that the amount entered by the customer at customer function 115 exceeds the working balance for the debit account, remote unit 60 adds the extended credit balance to the working balance for the debit account and compares the sum to the amount entered by the customer at customer function 115 as indicated by machine function 121. If machine function 122 indicates that the amount entered by the customer at customer function 115 exceeds the sum of the working balance for the debit account plus the extended credit balance, remote unit 60 changes the amount entered by the customer at machine function 115 so that it equals the sum of the working balance for the debit account plus the extended credit balance as indicated by machine function 122A.

Machine function 120 may indicate that the amount entered by the customer at customer function 115 does not exceed the working balance for the debit account. Alternatively, machine function 122 may indicate that the amount entered by the customer at customer function 115 does not exceed the sum of the working balance for the debit account plus the extended credit balance. Alternatively, remote unit 60 may have changed the amount entered by the customer so that it equals the sum of the working balance for the debit account plus the extended credit balance at machine function 122A. Remote unit 60 at machine function 126 then compares (a) the maximum cash limit with (b) the sum of the amount entered by the customer at customer function 115, or as changed at machine function 122A, plus the total of the customer's previous cash withdrawals. Of course, if the customer was performing his first cash withdrawal transaction since he entered his card, the total of the customer's previous cash withdrawals would be zero. If the sum exceeds the maximum cash limit, remote unit 60 denies the cash withdrawal and then queries the customer whether or not he desires another transaction as indicated by machine functions 123 and 124, respectively. If the customer responds that he wants another transaction as indicated by customer function 126S, remote unit 60 proceeds to machine function 109 and awaits the customer's selection of another transaction as indicated by customer function 108. If the customer responds that he does not desire another transaction as indicated by customer function 125, remote unit 60 proceeds to the customer close out sequence which will be described below.

Off-Line

If machine function 118 indicates that data read from card 10 and updated at machine function 81, if applicable, should be used to process the cash withdrawal, remote unit 60 proceeds as more particularly described in Voss et al., supra. Remote unit 60 compares the next usage date (NUD) with the current date and the amount remaining with the amount entered by the customer at customer function 115 as indicated by machine function 128. If machine function 129 indicates that the next usage date is later than the current date, remote unit 60 proceeds to machine function 123. If machine function 129 indicates that the next usage date is the same as or earlier than the current date and machine function 129A indicates that the amount entered by the customer at customer function 115 exceeds the amount remaining, remote unit 60 changes the amount entered by the customer at customer function 115 so that it equals the amount remaining as indicated by machine function 129B.

Cash Dispensing

If in the on-line mode machine function 127 indicates that the sum of the amount entered by the customer at customer function 115, or as changed at machine function 122A, plus the previous total of the customer's other cash withdrawals does not exceed the maximum cash limit, remote unit 60 dispenses cash in the amount entered by the customer at customer function 115, or as changed at machine function 122A, through cash slot 40 as indicated by machine function 130. If in the off-line mode machine function 129A indicates that the amount entered by the customer at customer function 115 does not exceed the amount remaining, remote unit 60 dispenses cash in the amount entered by the customer at customer function 115 through cash slot 40 as indicated by machine function 130. If in the off-line mode machine function 129A indicates that the amount entered by the customer at customer function 115 exceeds the amount remaining, causing the amount entered by the customer at customer function 115 to be changed so that it equals the amount remaining at machine function 129B, remote unit 60 dispenses cash equal to the amount remaining through cash slot 40 as indicated by machine function 130.

Thereafter, remote unit 60 determines whether it is in the on-line mode or the off-line mode as indicated by machine function 131. If machine function 131 indicates the on-line mode of operation, remote unit 60 debits the working balance (WB) for the debit account and/or the extended credit balance (ECB) as indicated by machine function 132. If the amount entered by the customer at customer function 115 does not exceed the working balance for the debit account, remote unit 60 debits the working balance for the debit account. If the amount entered by the customer at customer function 115 exceeds the working balance for the debit account, remote unit 60 debits the working balance for the debit account to zero and debits the extended credit balance by the amount which the amount entered by the customer at customer function 115 exceeds the working balance for the debit account. If the amount entered by the customer at machine function 115 exceeds the sum of the working balance for the debit account plus the extended credit balance, remote unit 60 debits both the working balance for the debit account and the extended credit balance to zero, since the amount of cash withdrawal was made equal to the sum of the working balance for the debit account plus the extended credit balance at machine function 122A. Remote unit 60 then records the customer's cash withdrawal in the transaction file of remote unit memory as indicated by machine function 133.

If machine function 131 indicates the off-line mode of operation, remote unit 60 records an image of the data from card 10, having been updated by data in the discretionary file at machine function 81, if applicable, in the duplicate card file as indicated by machine function 134. Remote unit 60 does not update the next usage date (NUD) if the amount entered by the customer at customer function 115 did not exceed the amount remaining. If the amount entered by the customer did exceed the amount remaining, remote unit 60 updates the next usage date to next usage date 18 plus usage interval 19 (FIG. 2) as indicated by machine function 134A. If the amount entered by the customer at machine function 115 does not exceed the amount remaining, remote unit 60 at machine function 134A debits the amount remaining by the amount entered by the customer at machine function 115. If the amount entered by the customer at machine function 115 exceeds the amount remaining, remote unit 60 updates the amount remaining to credit limit 20 (FIG. 2) as indicated by machine function 134A. Remote unit 60 then records the customer's cash withdrawal in the transaction file of remote unit memory as indicated by machine function 133. After an on-line or an off-line cash withdrawal has been recorded in the transaction file of remote unit memory, remote unit 60 proceeds to machine function 124.

Fund Transfer

If machine function 117 indicates that the customer has not selected a cash withdrawal, remote unit 60 determines whether or not the customer has selected a fund transfer as indicated by machine function 135. If machine function 135 indicates that the customer has selected a fund transfer, remote unit 60 again determines whether it is operating in the on-line mode or the off-line mode as indicated by machine function 136.

On-Line

If machine function 136 indicates the on-line mode of operation, remote unit 60 obtains the account descriptions in the reply message and determines whether or not more than one account can serve as the debit account for the fund transfer as indicated by machine function 50. That is, if the customer has selected a fund transfer from his savings account, for example, remote unit 60 determines whether or not the reply message included data for more than one savings account, any one of which could serve as the debit account. If machine function 51 indicates the presence of more than one possible debit account, the customer must enter a predetermined numerical designation using keyboard 38 to designate which one of the possible debit accounts he wants to debit in the fund transfer as indicated by customer function 52. Remote unit 60 senses the customer's entry of a predetermined numerical designation for a debit account as indicated by machine function 53.

If machine function 51 indicates that there is only one possible debit account or, in the case of multiple possible debit accounts, after machine function 53 indicates that the customer has entered a predetermined numerical designation to designate one of the several debit accounts for use in the fund transfer, remote unit 60 similarly obtains the account descriptions in the reply message and determines whether or not more than one account can serve as the receiving, or credit, account for the transferred funds as indicated by machine function 54. That is, if the customer has selected a fund transfer to his checking account, for example, remote unit 60 determines whether or not the reply message included data for more than one checking account, any one of which could serve as the credit account. If machine function 55 indicates the presence of more than one possible credit account, the customer must enter a predetermined numerical designation using keyboard 38 to designate which one of the possible credit accounts he wants to credit in the fund transfer as indicated by customer function 56. Remote unit 60 senses the customer's entry of a predetermined numerical designation for a credit account as indicated by machine function 57.

If machine function 55 indicates that there is only one possible credit account or, in the case of multiple possible credit accounts, machine function 57 indicates that the customer has entered a predetermined numerical designation to designate one of the several credit accounts for use in the fund transfer, remote unit 60 compares the amount entered by the customer at customer function 115 with the working balance for the debit account as indicated by machine function 137. If machine function 137A indicates that the amount entered by the customer at customer function 15 exceeds the working balance for the debit account, remote unit 60 proceeds to machine function 123. If machine function 137 indicates that the amount entered by the customer at customer function 115 does not exceed the working balance for the debit account, remote unit 60 debits the working balance (WB) for the debit account and writes the fund transfer in the transaction file of remote unit memory as indicated by machine functions 138 and 133, respectively.

Off-Line

If machine function 136 indicates the off-line mode of operation, remote unit 60 simply writes the fund transfer in the amount entered by the customer at customer function 115 in the transaction file of remote unit memory as indicated by machine function 133. After an on-line or an off-line fund transfer has been recorded in the transaction file of remote unit memory, remote unit 60 proceeds to machine function 124.

Deposit or Payment

If machine function 135 indicates that the customer has not selected a fund transfer, remote unit 60 by process of elimination will have determined that the customer has selected a deposit or payment. Accordingly, remote unit 60 operates depository 33 (FIG. 3) and writes the deposit or payment in the amount entered by the customer at customer function 115 in the transaction file of remote unit memory as indicated by machine functions 139 and 133, respectively. After a deposit or payment has been entered in the transaction file of remote unit memory, remote unit 60 proceeds to machine function 124.

Reference will now be made to FIG. 6 so that the transaction sequence performed by remote unit 60 can be described in greater detail. The customer selects one of transaction selector keys 31. The selected one of transaction selector keys 31 may be viewed schematically as generating a control signal. The selected one of transaction selector keys 31 activates "Enter Amount" lamp 325. A selected one of the group of three cash withdrawal transaction selector keys 34 gates the output of cash amount selector keys 37 via AND gate 250 to OR gate 251. A selected one of the group of six fund transfer transaction selector keys 35 gates the output of keyboard 38 via AND gate 252 to OR gate 251. Thus, when the customer enters a transaction amount using either cash amount selector keys 37 in the case of a cash withdrawal or keyboard 38 in the case of a fund transfer, the transaction amount enters debit amount register 253 via OR gate 251.

A signal that remote unit 60 is operating on-line from customer command temporary register 246 gates the transaction amount in debit amount register 253 via AND gate 254 to debit amount register 255 of comparator 256. A signal from the selected one of transaction selector keys 34 or transaction selector keys 35, which indicates the type of debit account, enters debit account type register 326 of comparator 327. For example, if the customer selected a cash-from-savings cash withdrawal using the appropriate transaction selector key 34, a signal which represents a savings account enters debit account type register 326 of comparator 327. The account descriptions in account description registers $237_n$ serially enter register 328 of comparator 327. Counter 329 counts the number of coincidences between (a) the type of debit account which is indicated by the selected one of transaction selector keys 34 or transaction selector keys 35 and (b) the account descriptions in account description registers $237_n$. n-Counter 330 gates the count from counter 329 to number of coincidences register 331 of comparator 332 via AND gate 333 after n-counter 330 counts a number of comparison operations by comparator 327 equal in number to the number of account descriptions in account description registers $237_n$.

If the number of possible debit accounts in number of coincidences register 331 of comparator 332 does not exceed one, comparator 332 signals AND gate 334. Comparator 335 also signals AND gate 334 in response to coincidence between the type of debit account indicated by the selected one of transaction selector keys 34 or transaction selector keys 35 and the account descriptions in account description registers $237_n$. The signals from comparators 332 and 335 gate the working balance for the debit account in working balance register $238_n$ corresponding to account description $237_n$ via AND gate 334 and OR gate 336 to AND gate 257.

If the number of possible debit accounts in number of coincidences register 331 of comparator 332 exceeds one, comparator 332 activates "Enter 'From' Account" lamp 337. Comparator 332 also signals AND gate 338. Comparator 339 signals AND gate 338 in response to coincidence between the predetermined numerical designation which the customer enters using keyboard 38 and the account suffixes in account description registers 237$_n$, which are gated to comparator 339 by the selected one of transaction selector keys 34 or transaction selector keys 35 via AND gate 339A. The signals from comparators 332 and 339 gate the working balance for the debit account in working balance register 238$_n$ corresponding to account description 237$_n$ designated by the customer via AND gate 338 and OR gate 336 to AND gate 257.

The selected one of transaction selector keys 34 or transaction selector keys 35 gates data in working balance register 238$_n$ for the debit account via AND gate 257, AND gate 257 also being gated by a signal that remote unit 60 is operating on-line from customer command temporary register 246, to available balance register 258 of comparator 256.

In the case of an on-line fund transfer a signal from the selected one of transaction selector keys 35, which indicates the type of credit account, enters credit account type register 340 of comparator 341. For example, if the customer selected a savings-to-checking fund transfer using the appropriate transaction selector key 35, a signal which represents a checking account enters credit account type register 340 of comparator 341. The account descriptions in account description registers 237$_n$ serially enter register 342 of comparator 341. Counter 343 counts the number of coincidences between (a) the type of credit account which is indicated by the selected one of transaction selector keys 35 and (b) the account descriptions in account description registers 237$_n$. n-Counter 344 gates the count from counter 343 to number of coincidences register 345 of comparator 346 via AND gate 347 after n-counter 344 counts a number of comparison operations by comparator 341 equal in number to the number of account descriptions in account description registers 237$_n$.

If the number of possible credit accounts in number of coincidences register 345 of comparator 346 does not exceed one, comparator 346 signals AND gate 348. Comparator 349 also signals AND gate 348 in response to coincidence between the type of credit account indicated by the selected one of transaction selector keys 35 and the account descriptions in account description registers 237$_n$. The signals from comparator 346 and 349 gate the account description for the credit account in account description register 237$_n$ via AND gate 348 and OR gate 375 to transaction file 215A.

If the number of possible credit accounts in number of coincidences register 345 of comparator 346 exceeds one, comparator 346 activates "Enter 'To' Account" lamp 376. Comparator 346 also signals AND gate 377. Comparator 378 signals AND gate 377 in response to coincidence between the predetermined numerical designation which the customer enters using keyboard 38 and the account suffixes in account description registers 237$_n$, which are gated to comparator 378 by the selected one of transaction select keys 35 via AND gate 378A. The signals from comparators 346 and 378 gate the account description for the credit account in account description register 237$_n$ via AND gate 377 and OR gate 375 to transaction file 215A.

If the transaction amount in debit amount register 255 of comparator 256 does not exceed the working balance for the debit account in available balance register 258 of comparator 256, comparator 256 produces one of two results. In the case of an on-line cash withdrawal, comparator 256 signals AND gate 259. The selected one of transaction selector keys 34 also signals AND gate 259. The signals from comparator 256 and the selected one of transaction selector keys 34 gate the transaction amount in debit amount register 253 via OR gate 322 to adder 311. IN the case of an on-line fund transfer comparator 256 gates the transaction amount in debit amount register 253 via AND gate 260, AND gate 260 also being gated by the selected one of transaction selector keys 35, to transaction file 215A via data line 264 ,thereby effecting an on-line fund transfer.

In the case of the on-line cash withdrawal comparator 256 signals AND gate 314 via OR gate 312. The signal from comparator 256 gates the customer's previous total of on-line cash withdrawals in previous total on-line cash withdrawal register 313 via AND gate 314 to adder 311. The sum of the transaction amount in debit amount register 253 and the customer's previous total of on-line cash withdrawals in previous total on-line cash withdrawal register 313 enters total on-line cash withdrawal register 318 of comparator 317 from adder 311. Comparator 256 also signals AND gate 315 via OR gate 312. The signal from comparator 256 gates the maximum cash limit in maximum cash limit register 236 via AND gate 315 to maximum cash limit register 316 of comparator 317.

If the sum of the transaction amount and the customer's previous total of on-line cash withdrawals in total on-line cash withdrawal register 318 of comparator 317 does not exceed the maximum cash limit in maximum cash limit register 316 of comparator 317, comparator 317 gates the transaction amount in debit amount register 253 via AND gate 319 (a) to cash dispenser 261 and (b) to transaction file 215A via OR gate 262 and data line 263, thereby effecting an on-line cash withdrawal. In addition, comparator 317 gates the sum of the transaction amount and the customer's previous total of on-line cash withdrawals via AND gate 320 to previous total on-line cash withdrawal register 313, thereby updating the customer's previous total of on-line cash withdrawals.

If the sum of the transaction amount and the previous total of on-line cash withdrawals for the customer in total on-line cash withdrawal register 318 of comparator 317 exceeds the maximum cash limit in maximum cash limit register 316 of comparator 317, comparator 317 activates "Limit Exceeded" lamp 272, thereby denying an on-line cash withdrawal.

Subtractor 266 subtracts the transaction amount in debit amount register 253 from the working balance for the debit account. In the case of the on-line cash withdrawal comparator 317 signals AND gate 310. The selected one of transaction selector keys 34 also signals AND gate 310. The signals from comparator 317 and the selected one of transaction selector keys 34 gate the difference from subtractor 266 via AND gate 310 and OR gate 321 to working blance register 238$_n$, thereby updating the working balance for the debit account. In the case of the on-line fund transfer, compatator 256 signals AND gate 265. The selected one of transaction selector keys 35 also signals AND gate 265. The signals from comparator 256 and the selected one of transaction selector keys 35 gate the difference from subtractor 266 via AND gate 265 and OR gate 321 to working balance register 238$_n$, thereby updating the working balance for the debit account.

If the transaction amount in debit amount register 255 of comparator 256 had exceeded the working balance for the debit account in available balance register 258 of comparator 256, comparator 256 produces one of two results. In the case of an on-line cash withdrawal comparator 256 signals AND gate 268. The selected one of transaction selector keys 34 also signals AND gate 268. The signals from comparator 256 and the selected one of transaction selector keys 34 gate the transaction amount in debit amount register 253 via AND gate 268 to debit amount register 270 of comparator 271, thereby initiating an on-line extended credit cash withdrawal. In the case of an on-line fund transfer, comparator 256 activates "Limit Exceeded" lamp 272 via AND gate 269, AND gate 269 being gated by the selected one of transaction selector keys 35, thereby denying an on-line fund transfer.

In the case of an on-line extended credit cash withdrawal, comparator 256 gates the sum of the working balance for the debit account and the extended credit balance in extended credit balance register 235 from adder 267 via AND gate 273 to extended credit and working balance sum register 274 of comparator 271. If the transaction amount in debit amount register 270 of comparator 271 does not exceed the sum of the working balance for the debit account and the extended credit balance in extended credit and working balance sum register 274 of comparator 271, comparator 271 signals AND gate 275. The selected one of transaction selector keys 34 also signals AND gate 275. The signals from comparator 271 and the selected one of transaction selector keys 34 gate the transaction amount in debit amount register 253 via AND gate 275 and OR gate 322 to adder 311. If the transaction amount in debit amount register 270 of comparator 271 exceeds the sum of the working balance for the debit account and the extended credit balance in extended credit and working balance sum register 274 of comparator 271, comparator 271 signals AND gate 275A and in addition activates "Limit Exceeded" lamp 272. The selected one of transaction selector keys 34 also signals AND gate 275A. The signals from comparator 271 and the selected one of transaction selector keys 34 gate the sum of the working balance for the debit account and the extended credit balance from adder 267 via AND gate 275A and OR gate 322 to adder 311. Thus, if the transaction amount entered by the customer exceeds the sum of the working balance for the debit account and the extended credit balance, the transaction amount is adjusted downward by making the transaction amount equal the sum of the working balance for the debit account and the extended credit balance.

In either case comparator 271 signals AND gate 314 via OR gate 312. The signal from comparator 271 gates the customer's previous total of on-line cash withdrawals in previous total on-line cash withdrawal register 313 via AND gate 314 to adder 311. The sum of (a) the original transaction amount in debit amount register 253 or the modified transaction amount from adder 267 and (b) the customer's previous total of on-line cash withdrawals in previous total on-line cash withdrawal register 313 enters total on-line cash withdrawal register 318 of comparator 317 from adder 311.

In either case comparator 271 also signals AND gate 315 via OR gate 312. The signal from comparator 271 gates the maximum cash limit in maximum cash limit register 236 via AND gate 315 to maximum cash limit register 316 of comparator 317.

If the sum of the transaction amount, original or modified, and the customer's previous total of on-line cash withdrawals in total on-line cash withdrawal register 318 of comparator 317 does not exceed the maximum cash limit in maximum cash limit register 316 of comparator 317, comparator 317 gates the transaction amount, original or modified, via AND gate 319 (a) to cash dispenser 261 and (b) to transaction file 215A via OR gate 262 and data line 263, thereby effecting an on-line extended credit cash withdrawal. In addition, comparator 317 gates the sum of the transaction amount, original or modified, and the customer's previous total of on-line cash withdrawals via AND gate 320 to previous total on-line cash withdrawal register 313, thereby updating the customer's previous total of on-line cash withdrawals.

If the sum of the transaction amount, original or modified, and the previous total of on-line cash withdrawals for the customer in total on-line cash withdrawal register 318 of comparator 317 exceeds the maximum cash limit in maximum cash limit register 316 of comparator 317, comparator 317 activates "Limit Exceeded" lamp 272, thereby denying an on-line extended credit cash withdrawal.

Subtractor 276 subtracts the transaction amount, original or modified, from the working balance for the debit account. In the case of the on-line extended credit cash withdrawal adder 277 adds the difference from subtractor 276 to the extended credit balance. Comparator 317 gates the sum from adder 277 via AND gate 278 to extended credit balance register 235, thereby updating the extended credit balance. Comparator 317 also gates zero via AND gate 279 to working balance register $238_n$, thereby updating the working balance for the debit account to zero.

In the case of an off-line cash withdrawal, a signal from status check 225 or customer command temporary register 246 that remote unit 60 is in the off-line mode and a signal from the selected one of transaction selector keys 34 gate the transaction amount in debit amount register 253 via AND gate 280 to debit amount register 282 of comparator 283. In the case of an off-line fund transfer, a signal from status check 225 or customer command temporary register 246 that remote unit 60 is in the off-line mode and a signal from the selected one of transaction selector keys 35 gate the transaction amount in debit amount register 253 via AND gate 281 and data line 284 to transaction file 215A, thereby effecting an off-line fund transfer.

In the case of the off-line cash withdrawal a signal from status check 225 or customer command temporary register 246 that remote unit 60 is in the off-line mode gates the next usage date in next usage date register 211 via AND gate 308 to next usage date register 286 of comparator 285. A signal from status check 225 or customer command temporary register 246 that remote unit 60 is in the off-line mode also gates the current date in date register 192 via AND gate 309 to current date register 287 of comparator 285.

If the next usage date in next usage date register 286 of comparator 285 does not exceed the current date in current date register 287 of comparator 285, comparator 285 signals AND gate 288. The selected one of transaction selector keys 34 also signals AND gate 288. The signals from comparator 285 and the selected one of transaction selector keys 34 gate the amount remaining in amount remaining register 213 via AND gate 288 to amount remaining register 289 of comparator 283. If the next usage date in next usage date register 286 of comparator 285 exceeds the current date in current date register 287 of comparator 285, comparator 285 activates "Limit Exceeded" lamp 272 via AND gate 290, AND gate 290 being gated by a signal from the selected one of transaction selector keys 34, thereby denying an off-line cash withdrawal.

If the transaction amount in debit amount register 282 of comparator 283 does not exceed the amount remaining in amount remaining register 289 of comparator 283, comparator 283 gates the transaction amount in debit amount register 253 via AND gate 291 to OR gate 292. If the transaction amount in debit amount register 282 of comparator 283 exceeds the amount remaining in amount remaining register 289 of comparator 283, comparator 283 gates the amount remaining in amount remaining register 213 via AND gate 293 to OR gate 292, thereby modifying the transaction amount to equal the amount remaining. Comparator 283 also activates "Limit Exceeded" lamp 272. The transaction amount, original or modified, is input via OR gate 292 (a) to cash dispenser 261 and (b) to transaction file 215A via OR gate 262 and data line 263, thereby effecting an off-line cash withdrawal. Subtractor 294 subtracts the transaction amount, original or modified, from the amount remaining in amount remaining register 213. In the case of an off-line cash withdrawal comparator 283, through OR gate 295, gates the difference from subtractor 294 via AND gate 296 to amount remaining register 213, thereby updating the amount remaining in amount remaining register 213.

Deposit/payment key 32 gates the output of keyboard 38 via AND gate 380 to deposit/payment amount register 381. Thus, when the customer enters a deposit/payment transaction amount using keyboard 38, the transaction amount enters deposit/payment amount register 381. A signal that remote unit 60 is operating either on-line or off-line from status check 225 or customer command temporary register 246 gates a signal from deposit/payment key 32 via AND gate 382. The signal from deposit/payment key 32 activates "Insert Deposit" lamp 384. The signal that remote unit 60 is operating either on-line or off-line from status check 225 or customer command temporary register 246 also gates the transaction amount in deposit/payment amount register 381 via AND gate 383, AND 383 also being gated by a signal from deposit/payment key 32, to AND gate 385. A signal from depository deposit sensor 306 gates the transaction amount at AND gate 385 to transaction file 215A via AND gate 385 and data line 307. The foregoing operational sequence for a deposit or payment applies to both on-line and off-line deposit/payment transactions.

Several specific examples of transactions will be described so that the description of the operation of remote unit 60 will be better understood. The transactions are exemplary and in no way limit the scope of transactions which remote unit 60 can perform. The examples relate to the on-line transaction sequence so that the data included in a reply message can be described in connection with the examples.

Central station CS (FIG. 1) transmits in the reply message to remote unit 60 inquiry balances for the customer's accounts. The inquiry balances are the actual balances for the customer's accounts with his bank. The inquiry balances are used solely for balance inquiry purposes.

Central station CS (FIG. 1) also transmits working balances to remote unit 60 for each of the customer's accounts. Central processing unit CPU (FIG. 1) computes the working balance for each of the customer's accounts using any method which the customer's bank desires. For example, central processing unit CPU (FIG. 1) can compute the working balance for each of the customer's accounts by multiplying the actual balance of the account by a predetermined percentage. Preferably, central processing unit CPU (FIG. 1) computes a working balance for each of the customer's accounts as a function of the actual balances of all of the customer's accounts with due regard to historical data with regard to the customer. The central processing unit CPU (FIG. 1), for example, can add the actual balances for each of the customer's credit-type accounts, such as his savings and checking accounts, and subtract therefrom the actual balances for each of the customer's debit-type accounts, such as mortage and loan accounts, and multiply by a percentage which depends upon the particular type of account to which the working balance appertains and a customer rating factor based upon prior dealings between customer and bank. These working balance computations relate only to accounts such as checking, savings and credit card for which the balances can be debited. For accounts such as loans and mortgages, the balances can only be credited so that working balances are zero.

Remote unit 60 keeps track of debits to account working balances by decreasing the debit account working balance after each transaction to limit the funds the customer can take as cash withdrawals or as transfers from his accounts. Remote unit 60 never increases the customer's account working balances during the transaction sequence. For example, if the customer transfers an account working balance into another account, such as savings to checking, the customer would not be able to take as a cash withdrawal the sum of the savings and checking account working balances from the checking account. He would be allowed only the working balance for the checking account as originally transmitted by central station CS (FIG. 1).

In order to facilitate the operation which is sometimes called "split deposit," central station CS (FIG. 1) transmits an extended credit balance to remote unit 60. "Split deposit" occurs when a customer deposits a large percentage of a check in one account, usually a checking account, and takes the remainder as cash. For example, suppose a customer has a check for $1,000.00, wants to deposit $900.00 ih his checking account and take $100.00 as cash.

By way of background, the "split deposit" is quite common with live-teller banking where the bank employee can exercise sufficient control over the transaction to assure relatively small risk to the bank. A live teller is able to make a decision to dispense cash in a "split deposit" transaction based on knowing the customer, knowing his account balances, etc.

In automated systems utilizing the conventional percentage method for "split deposits," there can be large risk for the bank if the check to be deposited is quite large. For example, if the procedure for "split deposits" is to allow up to 10 percent of a "split deposit" as a cash withdrawal, then a customer depositing $9,999.00 could take $1,000.00 cash and deposit $8,999.00 in his checking account.

As with the working balances, the central processing unit CPU (FIG. 1) can compute the amount of an extended credit balance based upon the customer's history, account balances, etc. The central station CS (FIG. 1) sends the extended credit balance to remote unit 60 in the reply message. The extended credit balance of the present invention provides a dollar amount, similar to the off-line credit limit 20 encoded on card 10 (FIG. 2) that can be extended to a customer in the case of a "split deposit" or other cash withdrawal. The extended credit balance is an amount which remote unit 60 will use in any cash withdrawal if the working balance for the debit account is not sufficient to satisfy the cash withdrawal.

In addition, even though remote unit 60 is operating on-line with access to the working balances for the customer's accounts, the bank may wish to limit the customer's cash withdrawals from remote unit 60 to a maximum dollar amount. On a given card insertion, the customer can take no more than the maximum cash limit transmitted in the reply message. Thus, remote unit 60 limits the sum of all the customer's combined cash withdrawals from his accounts to the maximum cash limit.

As a specific example, suppose central station CS (FIG. 1) transmits the following data to remote unit 60 in a reply message: checking account − inquiry balance = $200.00, working balance = $100.00; savings account − inquiry balance = $300.00, working balance = $200.00; credit card account − inquiry balance = $200.00, working balance = $200.00; loan − inquiry balance = $1,150,00, working balance = $0.00; mortgage − inquiry balance = $27,555.00, working balance = $0.00; extended credit balance = $100.00; and maximum cash limit = $500.00. If the customer requests a balance inquiry transaction, remote unit 60 prints the five inquiry balances in a memorandum as indicated by customer and machine functions 65, 110, 111 and 112. If the customer next requests a $200.00 cash withdrawal from his savings account, remote unit 60 dispenses $200.00 to the customer, debits the working balance for his savings account and records the cash withdrawal as indicated by customer and machine functions 108, 109, 115, 116, 117, 118, 63, 64, 119, 120, 126, 127, 130, 131, 132 and 133. If the customer then requests a transfer of $200.00 from his credit card account to his checking account, remote unit 60 debits the working balance for the customer's credit card account and records the fund transfer as indicated by customer and machine functions 108, 109, 115, 116, 117, 135, 136, 50, 51, 54, 55, 137, 137A, 138 and 133. Assume that the customer next requests a $300.00 cash withdrawal from his checking account. Notwithstanding the credit-card-to-checking fund transfer, remote unit 60 would not permit a cash withdrawal in this amount since the amount desired exceeds the sum of working balance for the checking account and the extended credit balance transmitted in the reply message. Remote unit 60 would, however, dispense $200.00 to the customer as indicated by customer and machine functions 108, 109, 115, 116, 117, 118, 63, 64, 119, 120, 121, 122, 122A, 126, 127, 130, 131, 132 and 133. The total of cash withdrawals is $400.00 which is below the $500.00 maximum cash limit.

Suppose the data for the customer's checking account in the above example was checking account − inquiry balance = $25.00, working balance = $10.00, Assume that the customer wants a "split deposit." He has a check for $500.00, wants to deposit $450.00 to his checking account and receive $50.00 cash. The customer would first deposit the full $500.00 to his checking account as indicated by customer and machine functions 108, 109, 115, 116, 117, 135, 139 and 133. The customer would then request $50.00 cash withdrawal from his checking account. Remote unit 60 dispenses $50.00 cash, reduces the working balance for the checking account to $0.00, reduces the extended credit balance by the amount which the amount desired exceeds the working balance for the checking account, i.e., $40.00, and records the cash withdrawal as indicated by customer and machine functions 108, 109, 115, 116, 117 118, 63, 64, 119, 120, 121, 122, 126, 127, 130, 131, 132 and 133. Thus, remote unit 60 utilizes the extended credit balance if the working balance for the debit account is not sufficient to satisfy the amount of the cash withdrawal. After the extended credit balance is consumed on a given entry of the card into the system, however, any further requests, which are not covered by the working balance originally transmitted in the reply message, are refused. Note that for fund transfers, the working balance for the debit account must equal or exceed the requested amount of fund transfer. If not, the fund transfer is not allowed since the extended credit balance is not used in connection with fund transfers.

To allow for multiple account operation during on-line operation, the reply message includes account descriptions which relate to each account inquiry balance and working balance. Remote unit 60 uses the account descriptions to derive which transaction selector keys to enable for the customer. The account description also indicates to remote unit 60 whether or not the account is a multiple account, for example, that the inquiry balance and the working balance are the balances for a savings account and that savings account is one of several savings accounts. Remote unit 60 delineates the multiple savings accounts by account suffix codes which are part of the account descriptions. Thus, remote unit 60 handles the multiple savings accounts as savings account suffix 01, 02, etc. To utilize the multiple account operation, therefore, the customer must know, for example, that checking account suffix 01 is his checking account, checking account suffix 02 is his wife's checking account, loan suffix 01 is his auto loan, 02 is his personal loan, 03 is his motorcycle loan, etc. Suppose that central station CS (FIG. 1) transmits the following accounts to remote unit 60: checking account (husband's) − account suffix code = 01, inquiry balance = $200.00, working balance = $100.00; checking account (wife's) − account suffix = 02, inquiry balance = $300.00, working balance = $100.00; savings account − inquiry balance = $300.00, working balance = $200.00; loan (personal) − account suffix = 01, inquiry balance = $1,150.00, working balance = $0.00; loan (motorcycle) − account suffix code = 02, inquiry balance = $500.00, working balance = $0.00. If the customer requests to transfer "checking to loan," remote unit 60 first instructs the customer to "Enter 'From' Account" as indicated by machine function 53. The customer then enters suffix code 02, for example, on keyboard 38. Remote unit 60 next instructs the customer to "Enter 'To' Account" as indicated by machine function 57. The customer then enters 02 on keyboard 38, for example. Remote unit 60 then proceeds to process the fund transfer as set forth in the example above.

Mixed On-Line/Off-Line Mode

The preceding description of the system of the present invention and its operation concerns operation in an "on-line" mode and operation in an "off-line" mode. In the "on-line" mode central station CS (FIG. 1) communicates data, including account descriptions, working balances, an extended credit balance and a maximum cash limit, to a remote unit. The remote unit enables transactions for customer selection and processes selected ones in accordance with this communicated data. In the "off-line" mode central station CS (FIG. 1) does not communicate data to a remote unit. The remote unit enables transactions for customer selection and processes selected ones in accordance with data read from the customer's card, including a control code, a next usage date and an amount remaining.

The previous description of the "on-line" mode of operation assumed that central station CS (FIG. 1) had all customer account files available; that is, central processing unit CPU (FIG. 1) had access to all customer account files, such as checking account, savings account, credit card account, loan account, etc. files. Thus, central processing unit CPU (FIG. 1) would be able to access all the customer's accounts and assemble in the reply message to the remote unit an account description, working balance, etc. for each of the customer's accounts. If the reply message contains account descriptions with regard to all the customer's accounts, the customer would have a selection of the same transactions he would have if the selection was determined by the remote unit based on the control code read from the customer's card. Thus, the same transaction selector keys 31 (FIG. 3) would be enabled both when the remote unit was operating in the "on-line" mode and the "off-line" mode.

In reality, however, a bank may not have all customer account files on-line for access by central processing unit CPU (FIG. 1). For example, only the checking account file may be accessible on-line, with all other files being batch-processed for update off-line. In this case only the customer's checking account descriptions, working balances, etc. would ordinarily be assembled in the reply message to the remote unit. Consequently, the remote unit would ordinarily enable transactions involving only the customer's checking account, such as cash from checking, for customer selection. If the customer also maintains, for example, a savings account with his bank, the customer would not ordinarily have a selection of the same transactions he would have if the selection was determined by a remote unit based on the control code read from the customer's card. More significantly, the customer would not be able to select a transaction involving, for example, his savings account such as a fund transfer from savings to checking, which could mean such consequences as dishonor of a customer's check on presentment by a holder because of insufficient funds in the checking account to which the customer wanted to transfer funds.

In order that a remote unit can enable the same transaction selector keys and, thus, allow the customer to select the same transactions in both the on-line mode and the off-line mode, the remote unit may assemble and transmit in the request message to central station CS (FIG. 1) certain information, including the control code read from the card. When a customer's control code is received in the request message, central processing unit CPU (FIG. 1) determines which customer account files are off-line. Central station CS (FIG. 1) assembles and transmits in the reply message the account descriptions, working balances, etc., for those customer account files which are on-line and the account descriptions with blank fields for balances for those customer account files which are off-line.

With the card's control code, central station CS (FIG. 1) can transmit all the necessary account descriptions, balance fields or blank fields to allow the remote unit to enable the same transaction selector keys in both the on-line mode and the off-line mode. For example, the checking account file is on-line — inquiry balance = $478.39, working balance = $200.00; the credit card account file is on-line — inquiry balance = $300.00, working balance = $300.00; and the savings account file is off-line (blank fields). The remote unit does not print an inquiry balance for an account for which blank balance fields are received. In the example, the remote unit would print the inquiry balances for the customer's checking and credit card accounts but would not print an inquiry balance for his savings account. The remote unit determines which transaction selector keys to enable from the account descriptions as previously described in connection with "on-line" operation.

When the customer makes a transaction selection, the remote unit determines whether or not the balance data indicates the transaction involves an on-line or an off-line debit account. In the example, the remote unit determines that the checking and credit card accounts are on-line accounts since the balance fields do not contain blanks whereas the savings account is an off-line account since the balance fields contain blanks. If the selected transaction involves an on-line debit account, all the previous on-line operations apply. Cash withdrawals are limited by the working balance of the debit account and the extended credit balance if needed, all subject to the maximum cash limit. Transfers are limited by the working balance for the debit account. If the selected transaction involves an off-line debit account, the off-line operations generally apply. Any transfers will be allowed, and cash withdrawals are controlled by the next usage data and amount remaining on the card, but limited by the maximum cash limit. If any cash is taken from an off-line account, the card's amount remaining field is updated. The customer's transactions recorded in transaction file 215A may be a mixture of "on-line" and "off-line" transactions.

Multiple Transaction Capability

Referring to FIG. 5, at the conclusion of each transaction remote unit 60 proceeds to machine function 124 and queries the customer whether or not he desires another transaction. If the customer desires another transaction, he depressed "Yes" key 36, and remote uniyt 60 proceeds to machine function 109, thereby initiating a new transaction cycle. If the customer depresses "No" key 36 or if the customer does not timely respond to the query with regard to another transaction, remote unit 60 proceeds to the customer close out sequence which will now be described.

Customer Close Out

Referring to FIG. 5, in the customer close out sequence remote unit 60 records the transaction data, which has been entered in transaction file 215A (FIG. 6), on punched tape, or magnetic tape, disk, etc., as indicated by machine function 150. Remote unit 60 next determines at machine function 151 whether or not a card update flag has been set at machine function 82 or machine function 99 or machine function 134A. If machine function 151 indicates that the card must be updated, remote unit 60 updates card 10 as indicated by machine function 152. As shown in FIG. 6, card reader/writer 43 accesses data from card data register 205 and rewrites card 10.

Returning to FIG. 5, remote unit 60 prepares a receipt which includes the transaction data which has been entered in transaction file 215A (FIG. 6) and dispenses the receipt to the customer as indicated by machine functions 153 and 154, respectively. If machine function 151 does not indicate that the card must be updated, remote unit 60 simply prints a receipt and dispenses the receipt to the customer as indicated by machine functions 153 and 154, respectively. Referring to FIG. 6, printer 249 accesses transaction data which has been entered in transaction file 215A and prints a receipt at 390.

Returning to FIG. 5, after remote unit 60 dispenses the receipt to the customer as indicated by machine function 154, remote unit 60 returns card 10 to the customer as indicated by machine function 156. Remote unit 60 then determines whether or not protective door 45 is open as indicated by machine function 157. If machine function 157 indicates that protective door 45 is open, remote unit 60 closes protective door 45 as indicated by machine function 158.

If machine function 157 indicates that protective door 45 is closed, or after remote unit 60 closes protective door 45 at machine function 158, remote unit 60 then determines whether or not transaction file 215A (FIG. 6) contains any untransmitted transaction data as indicated by machine function 159. If no transaction data is recorded in transaction file 215A (FIG. 6), remote unit 60 returns to idle. If machine function 159 indicates that transaction file 215A (FIG. 6) contains untransmitted transaction data, remote unit 60 determines whether it is operating in the on-line mode or the off-line mode as indicated by machine function 160. If machine function 160 indicates that remote unit 60 is operating in the on-line mode, remote unit 60 assembles and transmits completion messages to central station CS (FIG. 1) as indicated by machine function 161. As shown in FIG. 6, remote unit 60 accesses data in transaction file 215A and assembles and transmits completion messages at 299.

FIG. 9 illustrates the format of a completion message. An on-line completion message includes 12-character completion message sentinel 400; 20-character account number and suffix and leading zeros 401; four-character system utilization serial number 402; six-character date 403, which comprises two characters for month, two characters for day and two characters for year; four-character time 404, which comprises two characters for hour and two characters for minute; eight-character bank code and leading zeros 405; and one-character new line code 406. New line code 406 is followed by one or more groups of data. Each group of data includes three-character transaction identification $407_n$; two-character "From" account suffix $408_n$; two-character "To" account suffix $409_n$; three-character serial number $410_n$ corresponding to the number printed on a deposit or payment envelope (if it is a depository-activated transaction); six-character transaction amount $411_n$, which comprises four characters for dollars and two characters for cents; and new line code $412_n$. An off-line completion message is similar to an on-line completion message. The off-line completion message, however, does not include "From" and "To" account suffixes $408_n$ and $409_n$, respectively.

Referring to FIG. 5, in the preferred embodiment of the system of the present invention, remote unit 60 detects a change in operational mode from off-line to on-line as indicated by machine function 162. If machine function 162 indicates that remote unit 60 has changed from the off-line mode to the on-line mode of operation, remote unit 60 proceeds to machine function 159. Thus, any transaction data stored in transaction file 215A (FIG. 6) for transactions which were processed by remote unit 60 while remote unit 60 was operating in the off-line mode is transmitted in completion messages to central station CS following the resumption of the on-line mode of operation. Remote unit 60 is also responsive to a shut down command from central station CS (FIG. 1) as indicated by machine function 163, to cease operation both on-line and off-line, until machine function 162 indicates a subsequent status change command has been received from the central station.

As noted, FIG. 6 is a schematic representation of the construction of remote unit 60. The construction can be implemented by hardware or by software using a programmed computer. Thus, the system of the present invention contemplates implementation using either hard-wired circuitry or a general purpose digital computer programmed to perform the functions of a hard-wired remote unit, or a combination of both hard-wired circuitry and computer software.

In summary, the system of the present invention employs remote units which are preferably responsive to commands from a central station (a) to not operate or (b) to operate in an off-line mode, wherein there is no communication between a remote unit and the central station, or an on-line mode, wherein there is communication between a remote unit and the central station.

In the off-line mode a remote unit operates similarly to conventional off-line automated tellers. However, when a remote unit becomes operative in the on-line mode, all off-line transaction data is transmitted to the central station for accounting, thereby updating customers' master account files.

In the on-line mode, rather than the central station processing each customer transaction, the central station transmits a single data message to a remote unit including account descriptions, actual and working account balances, an extended credit balance and a maximum cash limit. The remote unit uses the transmitted data to process any number of transactions selected by the customer. This results in a minimizing of central processing unit time and communication time between the central station and a remote unit, rendering the system of the present invention distinctly advantageous over prior art systems. Moreover, the system of the present invention utilizes line security and transaction processing methods, such as use of an extended credit balance in lieu of a percentage rule with respect to "split deposits." This means that the advantages of the system of the present invention may be obtained without sacrificing system integrity. The on-line mode also provides for transmission of on-line transaction data by a remote unit to the central station for accounting.

Having described the invention what is claimed is:

1. In an automated banking system having a central processing unit coupled to a remote unit via a communication link, the improvement comprising:
    a card with customer-identifying information encoded thereon, said customer-identifying information being unique to said customer,
    a card reader associated with said remote unit and responsive to said customer-identifying information encoded on said card for reading said customer-identifying information,
    request message assembly means associated with said remote unit responsive to said customer-identifying information read from said card for preparing and transmitting a request message containing said customer-identifying information to said central processing unit via said communication link, reply message assembly means associated with said central processing unit and responsive to said request message received from said remote unit for preparing and transmitting to said remote unit a reply message containing account data associated with said identified customer, said account data including (a) account description information designating multiple different accounts of said customer and (b) account balance information for said multiple different accounts of said customer, transaction selection means associated with said remote unit responsive to said account description information in said reply message for permitting said customer to select a series of different transactions involving said multiple different accounts, including cash withdrawal and/or fund transfer and/or deposits and/or payments, amount selection means associated with said remote unit for customer-entry of a series of different transaction amounts corresponding, respectively, to transactions of said series of different transactions, transaction processing means associated with said remote unit responsive to customer actuation of said transaction selection means and said amount selection means for processing independently of said central processing unit said different customer-selected transactions for said different customer-entered amounts in accordance with said account balance information in said reply message so as to determine the allowability of said series of different transactions, whereby a customer upon a single insertion of his card into said card reader may perform a series of different transactions involving different accounts for different amounts based upon transmission of a single request message to said central processing unit containing said customer-identifying information and receipt of a single reply message from said central processing unit containing said account data, thereby economizing utilization of said communication link and said central processing unit.

2. The system of claim 1 wherein said transaction selection means includes an actual account balance inquiry transaction selector for customer actuation, said actual account balance inquiry transaction selector being actuable by said customer prior to the availability for selection of other transactions, said system further comprising:

a printer associated with said remote unit responsive to said account data in said reply message and under control of said actual account balance inquiry transaction selector for printing said actual account balances prior to said other customer-selected transactions, whereby a customer may obtain his actual account balances in secrecy and, thus, learn what actual balances are contained in his various accounts before performing other transactions, thereby facilitating transactions in amounts permitted by said account balance information transmitted from said central processing unit.

3. The system of claim 1 wherein said reply message assembly means also supplies a working balance associated with each one of said customer's accounts for inclusion in said reply message, each said working balance not exceeding the actual account balance for said associated one of said customer's accounts, and wherein said transaction processing means processes said customer-selected transactions in accordance with said working balances for said customer's accounts, said transaction processing means permitting each of said customer-selected transactions in an amount which does not exceed the working balance of said customer's account from which said customer indicates said transaction amount is to be deducted, whereby system operation compensates for presumed customer debits in transit and customer-selected transactions based on deposits which have been posted by a bank but which have not yet cleared.

4. The system of claim 3 further comprising a cash dispenser associated with said remote unit for dispensing cash in response to customer selection of cash withdrawals and customer entry of amounts and under control of said transaction processing means, wherein said reply message assembly means also supplies an extended credit balance for inclusion in said reply message and wherein said transaction processing means processes said customer-selected cash withdrawals in accordance with said working balances for said customer's accounts and said extended credit balance, said transaction processing means applying the balance of said extended credit balance to each of said customer-selected cash withdrawals in which said customer-entered amount exceeds the working balance of said customer's account from which said customer indicates said cash withdrawal is to be deducted, said extended credit balance being decremented by the amount which said cash withdrawal exceeds said working balance of said customer's account from which said customer indicates said cash withdrawal is to be deducted, said transaction processing means permitting each said customer-selected cash withdrawal in an amount which does not exceed the sum of the working balance of said customer's account from which said customer indicates said cash withdrawal is to be deducted and the balance of said extended credit balance, whereby the system dispenses cash to said customer in an amount which exceeds the working balance of one of said customer's accounts but which does not exceed the sum of said working balance plus said extended credit balance, thereby facilitating split deposit transactions in which said customer desires to withdraw cash in an amount which exceeds said one or more working balances.

5. The system of claim 4 wherein said reply message assembly means also supplies a predetermined maximum cash limit for inclusion in said reply message and wherein said transaction processing means limits the sum of all customer-selected cash withdrawals to said maximum cash limit.

6. The system of claim 1 further comprising a cash dispenser associated with said remote unit, wherein said reply message assembly means also supplies a predetermined maximum cash limit for inclusion to said reply message and wherein said transaction processing means limits the sum of all customer-selected cash withdrawals to said maximum cash limit.

7. The system of claim 1 further comprising:
card capture means in said remote unit, including
memory means,
analyzing means, and
card retaining means, said analyzing means being responsive to said customer-identifying information read from said card and said memory means for actuating said card retaining means if said memory means indicates said card is designated for capture, and wherein said request message assembly means is under control of said card capture means, said request message assembly means preparing said request message only in the event said card is not retained, whereby said remote unit does not utilize communication and central processing unit time when said card has been designated for capture.

8. The system of claim 1 wherein said reply message assembly means also supplies card updating data for inclusion in said reply message, said system further comprising a card updater associated with said remote unit responsive to said reply message for updating said information on said card in accordance with said card updating data.

9. The system of claim 8 further comprising card capture means associated with said remote unit and responsive to said reply message for retaining said card when said card updating data designated said card for capture.

10. The system of claim 1 further comprising clock means associated with said remote unit for providing changing time and date information, and wherein said request message assembly means is also responsive to said time and date information for including said time and date information in said request message, and wherein said reply message assembly means is responsive to said time and date information in said request message for generating a first security code for inclusion in said reply message, and wherein said transaction processing means is responsive to said time and date information for generating a second security code, said system further comprising comparison means associated with said remote unit for comparing said first security code with said second security code, said comparison means denying said transactions in the event said first and second security codes do not compare favorably, whereby changing time and date information is used in calculating security codes which are in turn used to maintain system integrity in the event said communication link is accessed for the purpose of supplying a simulated reply message to said remote unit for the purpose of conducting fraudulent transactions.

11. The system of claim 1 further comprising:
completion message assembly means associated with said remote unit under control of said transaction processing means for preparing and transmitting a completion message of said customer-selected transactions to said central processing unit via said communication link after said series of different transactions, and
account updating means associated with said central processing unit and responsive to said completion message for updating customer account data stored at said central processing unit in accordance with said completion message received from said remote unit,
whereby said central processing unit assumes responsibility for updating customer account data stored at said central processing unit based on transactions processed by said remote unit.

12. the system of claim 1 further comprising multiple debit and credit account analyzing means and customer debit and credit account designation means associated with said remote unit, wherein said multiple debit and credit account analyzing means is responsive to said account description information and under control of said transaction selection means for determining if a plurality of said multiple different accounts can serve as the account from which said customer-selected transaction indicates said customer-entered amount is to be deducted and/or to which said customer-selected transaction indicates said customer-entered amount is to be added, said debit and credit analyzing means also being responsive to entry of at least one predetermined designation by said customer from said customer debit and credit account designation means for determining which of said plurality of said multiple different accounts should serve as said debit and/or credit accounts.

13. In an automated banking system having a central processing unit coupled to a remote unit via a communication link, the improvement comprising:
a card with customer-identifying information encoded thereon, said customer-identifying information being unique to said customer,
a card reader associated with said remote unit and responsive to said customer-identifying information encoded on said card for reading said customer-identifying information,
request message assembly means associated with said remote unit responsive to said customer-identifying information read from said card for preparing and transmitting a request message containing said customer-identifying information to said central processing unit via said communication link,
reply message assembly means associated with said central processing unit and responsive to said request message received from said remote unit for preparing and transmitting to said remote unit a reply message containing account data associated with said identified customer, said account data including (a) account description information designating multiple different accounts of said customer and (b) account balance information for said multiple different accounts of said customer,
transaction selection means associated with said remote unit responsive to said account description information in said reply message for permitting said customer to select at least one of a plurality of different transactions involving said multiple different accounts, including cash withdrawal and/or fund transfer and/or deposits and/or payments,
amount selection means associated with said remote unit for customer-entry of at least one transaction amount corresponding to said at least one transaction,
transaction processing means associated with said remote unit responsive to customer actuation of said transaction selection means and said amount selection means for processing independently of said central processing unit said at least one customer-selected transaction for said at least one customer-entered amount in accordance with said account balance information in said reply message so as to determine the allowability of said at least one transaction,
whereby a customer upon a single insertion of his card into said card reader may perform at least one of a plurality of different transactions involving different accounts for at least one selective amount based upon transmission of a single request message to said central processing unit containing said customer-identifying information and receipt of a single reply message from said central processing unit containing said account data, thereby economizing utilization of said communication link and said central processing unit.

14. In an automated banking system having a central processing unit coupled to a remote unit via a communication link, the improvement comprising:

a card with customer-identifying information encoded thereon, said customer-identifying information being unique to said customer, a card reader associated with said remote unit and responsive to said customer-identifying information encoded on said card for reading said customer-identifying information, request message assembly means associated with said remote unit responsive to said customer-identifying information read from said card for preparing and transmitting a request message containing said customer-identifying information to said central processing unit via said communication link, reply message assembly means associated with said central processing unit and responsive to said request message received from said remote unit for preparing and transmitting to said remote unit a reply message containing account data associated with said identified customer, said account data including account balance information for said customer, amount selection means associated with said remote unit for customer-entry of a series of different transaction amounts corresponding, respectively, to transactions of a series of different transactions, transaction processing means associated with said remote unit responsive to customer actuation of said amount selection means for processing independently of said central processing unit said series of different transactions for said different customer-entered amounts in accordance with said account balance information in said reply message so as to determine the allowability of said series of different transactions.

whereby a customer upon a single insertion of his card into said card reader may perform a series of different transactions for different amounts based upon transmission of a single request message to said central processing unit containing said customer-identifying information and receipt of a single reply message from said central processing unit containing said account data, thereby economizing utilization of said communication link and said central processing unit.

15. In an automated banking system having a central processing unit coupled to a remote unit via a communication link, the improvement comprising:

a card with customer-identifying information encoded thereon, said customer-identifying information being unique to said customer, a card reader associated with said remote unit and responsive to said customer-identifying information encoded on said card for reading said customer-identifying information, request message assembly means associated with said remote unit responsive to said customer-identifying information read from said card for preparing and transmitting a request message containing said customer-identifying information to said central processing unit via said communication link, reply message assembly means associated with said central processing unit and responsive to said request message received from said remote unit for preparing and transmitting to said remote unit a reply message containing account data associated with said identified customer, said account data including account balance information for said customer, amount selection means associated with said remote unit for customer-entry of a transaction amount, transaction processing means associated with said remote unit responsive to customer actuation of said amount selection means for processing independently of said central processing unit said transaction for said customer-entered amount in accordance with said account balance information in said reply message so as to determine the allowablity of said transaction, whereby a customer upon a single insertion of his card into said card reader may perform a transaction for a selective amount based upon transmission of a single request message to said central processing unit containing said customer-identifying information and receipt of a single reply message from said central processing unit containing said account data, thereby economizing utilization of said communication link and said central processing unit.

16. An automated banking system available to a plurality of customers for processing banking transactions comprising:

a card with customer-identifying information, credit limit information and permissible transaction information encoded thereon, at least one remote unit alternatively operable in on-line and off-line modes, a card reader associated with said at least one remote unit and responsive to said information encoded on said card for reading said information, a central processing unit, a communication link for interconnecting said at least one remote unit and said central processing unit, request message assembly means associated with said at least one remote unit and responsive, when said at least one remote unit is in said on-line mode, to said customer-identifying information read from said card for preparing and transmitting a request message containing said customer-identifying information to said central processing unit via said communication link, reply message assembly means associated with said central processing unit and responsive to said request message received from said at least one remote unit for preparing and transmitting to said at least one remote unit a reply message containing account data associated with said identified customer, said account data including (a) account description information designating multiple different accounts of said customer and (b) account balance information for said multiple different accounts of said customer, transaction selection means associated with said at least one remote unit and responsive, when said at least one remote unit is in said on-line mode, to said account description information in said reply message from said central processing unit and responsive, when said at least one remote unit is in said off-line mode, to said permissible transaction information read from said card, respectively, for permitting said customer to select a series of different transactions, including cash withdrawal and/or fund transfer and/or deposits and/or payments, amount selection means associated with said at least one remote unit for customer-entry of a series of different transaction amounts corresponding, respectively, to transactions of said series of different transactions, transaction processing means associated with said at least one remote unit and responsive to customer actuation of said transaction selection means and said mount selection means, when said at least one remote unit is in said on-line and off-line modes, for processing independently of said central processing unit said different customer-selected transactions for said different customer-selected amounts in accordance with said account balance information in said reply message when said at least one remote unit is in said on-line mode and in accordance with said credit information read from said card when said at least one remote unit is in said off-line mode, respectively, so as to determine the allowabiity of said series of different transactions.

17. The system of claim 16 further comprising command means associated with said central processing unit for alternatively generating and transmitting on-line and off-line command signals to said at least one remote unit via said communication link and wherein said at least one remote unit is responsive to said on-line command signal for operating in said on-line mode and responsive to said off-line command signal for operating in said off-line mode, whereby said central processing unit determines the mode of operation of said at least remote unit.

18. The system of claim 16 further comprising timing means associated with said at least one remote unit responsive, when said at least one remote unit is in said on-line mode, to the nonreceipt of a reply message following transmission of a request message for causing said at least one remote unit to switch its mode of operation to said off-line mode, whereby use of the system initiated with a remote unit in the on-line mode is completed in the off-line mode when the central processing unit fails to timely transmit a reply message in response to a request message.

19. The system of claim 16 further comprising:
card capture means in said at least one remote unit, including
memory means,
analyzing means, and
card retaining means,
said analyzing means being responsive to said customer-identifying information read from said card and said memory means for actuating said card retaining means if said memory means indicates said card is designated for capture, said analyzing means being operative when said at least one remote unit is in said on-line and off-line modes, and wherein said request message assembly means is under control of said card capture means when said at least one remote unit is in said on-line mode to prepare said request message only in the event said card is not retained, whereby said at least one remote unit does not utilize communication and central processing unit time when said card has been designated for capture and said at least one remote unit is in said on-line mode.

20. The system of claim 16 wherein said reply message assembly means also supplies card updating data for inclusion in said reply message, said system further comprising a card updater associated with said at least one remote unit responsive, when said at least one remote unit is in said on-line mode, to said reply message for updating at least one of said credit limit information and permissible transaction information on said card in accordance with said card updating data.

21. The system of claim 20 further comprising card capture means associated with said at least one remote unit and responsive, when said at least one remote unit is in said on-line mode, to said reply message for retaining said card when said card updating data designates said card for capture.

22. The system of claim 16 wherein said reply message assembly means is responsive to said request message received from said at least one remote unit when said at least one remote unit is in said on-line mode for generating a first security code for inclusion in said reply message, and wherein said transaction processing means is responsive to said reply message for generating a second security code, said system further comprising comparison means associated with said at least one remote unit for comparing said first security code with said second security code when said at least one remote unit is in said on-line mode, said comparison means causing said at least one remote unit to operate in said off-line mode in the event said first and second security codes do not compare favorably, whereby a failure in line security causes the system to switch to the off-line mode and process transactions in accordance with said credit limit and permissible transaction information on said card.

23. The system of claim 16 further comprising clock means associated with said at least one remote unit for providing changing time and date information and wherein said request message assembly means is also responsive to said time and date information for including said time and date information in said request message when said at least one remote unit is in said on-line mode, and wherein said reply message assembly means is responsive to said time and date information in said request message for generating a first security code for inclusion in said reply message, and wherein said transaction processing means is responsive to said time and date information for generating a second security code, said system further comprising comparison means associated with said at least one remote unit for comparing said first security code with said second security code when said at least one remote unit is in said on-line mode, said comparison means causing said at least one remote unit to operate in said off-line mode in the event said first and second security codes do not compare favorably, whereby a failure in line security causes the system to switch to the off-line mode and process the transactions in accordance with said credit limit and permissible transaction information on said card.

24. The system of claim 16 further comprising:
completion message assembly means associated with said at least one remote unit and under control of said transaction processing means for preparing and transmitting a completion message of said customer-selected transactions to said central processing unit via said communication link after said series of different transactions when said at least one remote unit is in said on-line mode, and account updating means associated with said central processing unit and responsive to said completion message for updating customer account data stored at said central processing unit in accordance with said completion message received from said at least one remote unit, whereby said central processing unit assumes responsibility for updating customer account data stored at said central processing unit based on transactions processed by said at least one remote unit.

25. The system of claim 24 further comprising record storage means associated with said at least one remote unit and under control of said transaction processing means for storing a record of said customer-selected transactions when said at least one remote unit is in said off-line mode, and wherein said completion message assembly means is responsive to said at least one remote unit being returned to said on-line mode for preparing and transmitting transaction record stored in said record storage means at said at least one remote unit to said central processing unit for updating said customer account data.

26. The system of claim 16 further comprising multiple debit and credit account analyzing means and customer debit and credit account designation means associated with said at least one remote unit, wherein said multiple debit and credit account analyzing means is responsive to said account description information and under control of said transaction selection means, when said at least one remote unit is in said on-line mode, for determining if a plurality of said multiple different accounts can serve as the account from which said customer-selected transaction indicates said customer-entered amount is to be deducted and/or to which said customer-selected transaction indicates said customer-entered amount is to be added, said debit and credit account analyzing means also being responsive to entry of at least one predetermined designation by said customer from said customer debit and credit account designation means, when said at least one remote unit is in said on-line mode, for determining which of said plurality of said multiple different accounts should serve as said debit and/or credit accounts.

27. An automated banking system available to a plurality of customers for processing banking transactions comprising:

a card with customer-identifying information, credit limit information and permissible transaction information encoded thereon, at least one remote unit alternatively operable in on-line and off-line modes, a card reader associated with said at least one remote unit and responsive to said information encoded on said card for reading said information, a central processing unit, a communication link for interconnecting said at least one remote unit and said central processing unit, request message assembly means associated with said at least one remote unit and responsive, when said at least one remote unit is in said on-line mode, to said customer-identifying information read from said card for preparing and transmitting a request message containing said customer-identifying information to said central processing unit via said communication link, reply message assembly means associated with said central processing unit and responsive to said request message received from said at least one remote unit for preparing and transmitting to said at least one remote unit a reply message containing account data associated with said identified customer, said account data including (a) account description information designating multiple different accounts of said customer and (b) account balance information for said multiple different accounts of said customer, transaction selection means associated with said at least one remote unit and responsive, when said at least one remote unit is in said on-line mode, to said account description information in said reply message from said central processing unit and responsive, when said at least one remote unit is in said off-line mode, to said permissible transaction information read from said card, respectively, for permitting said customer to select at least one of a plurality of different transactions, including cash withdrawal and/or fund transfer and/or deposits and/or payments, amount selection means associated with said at least one remote unit for customer-entry of at least one transaction amount corresponding to said at least one transaction, transaction processing means associated with said at least one remote unit and responsive to customer actuation of said transaction selection means and said amount selection means, when said at least one remote unit is in said on-line and off-line modes, for processing independently of said central processing unit said at least one customer-selected transaction for said at least one customer-selected amount in accordance with said account balance information in said reply message when said at least one remote unit is in said on-line mode and in accordance with said credit information read from said card when said at least one remote unit is in said off-line mode, respectively, so as to determine the allowability of said at least one transaction.

28. An automated banking system available to a plurality of customers for processing banking transactions comprising:

a card with customer-identifying information, credit limit information and permissible transaction information encoded thereon, at least one remote unit alternatively operable in on-line and off-line modes, a card reader associated with said at least one remote unit and responsive to said information encoded on said card for reading said information, a central processing unit, a communication link for interconnecting said at least one remote unit and said central processing unit, request message assembly means associated with said at least one remote unit and responsive, when said at least one remote unit is in said on-line mode, to said customer-identifying and permissible transaction information read from said card for preparing and transmitting a request message containing said customer-identifying and permissible transaction information to said central processing unit via said communication link, reply message assembly means associated with said central processing unit and responsive to said request message received from said at least one remote unit for preparing and transmitting to said at least one remote unit a reply message containing account data associated with said identified customer, said account data including (a) account description information designating multiple different accounts of said customer and (b) account balance information for said multiple different accounts of said customer, transaction selection means associated with said at least one remote unit and responsive, when said at least one remote unit is in said on-line mode, to said account description information in said reply message from said central processing unit and responsive, when said at least one remote unit is in said off-line mode, to said permissible transaction information read from said card, respectively, for permitting said customer to select a series of different transactions, including cash withdrawal and/or fund transfer and/or deposits and/or payments, amount selection means associated with said at least one remote unit for customer-entry of a series of different transaction amounts corresponding, respectively, to transactions of said series of different transactions, transaction processing means associated with said at least one remote unit and responsive to customer actuation of said transaction sellection means and said amount selection means, when said at least one remote unit is in said on-line and off-line modes, for processing independently or said central processing unit different customer-selected transactions for said customer-selected amounts in accordance with said account balance information in said reply message when said at least one remote unit is in said on-line mode and in accordance with said credit information read from said card when said at least one remote unit is in said off-line mode, respectively.

29. An automated banking system available to a plurality of customers for processing banking transactions comprising:
a card with customer-identifying information, credit limit information and permissible transaction information encoded thereon,
at least one remote unit alternatively operable in on-line and off-line modes,
a card reader associated with said at least one remote unit and responsive to said information encoded on said card for reading said information,
a central processing unit,
a communication link for interconnecting said at least one remote unit and said central processing unit,
request message assembly means associated with said at least one remote unit and responsive, when said at least one remote unit is in said on-line mode, to said customer-identifying and permissible transaction information read from said card for preparing and transmitting a request message containing said customer-identifying and permissible transaction information to said central processing unit via said communication link,
reply message assembly means associated with said central processing unit and responsive to said request message received from said at least one remote unit for preparing and transmitting to said at least one remote unit a reply message containing account data associated with said identified customer, said account data including (a) account description information designating multiple different accounts of said customer and (b) account balance information for said multiple different accounts of said customer, transaction selection means associated with said at least one remote unit and responsive, when said at least one remote unit is in said on-line mode, to said account description information in said reply message from central processing unit and responsive, when said at least one remote unit is in said off-line mode, to said permissible transaction information read from said card, respectively, for permitting said customer to select at least one of a plurality of different transactions, including cash withdrawal and/or fund transfer and/or deposits and/or payments, amount selection means associated with said at least one remote unit for customer-entry of at least one transaction amount corresponding to said at least one transaction, transaction processing means associated with said at least one remote unit and responsive to customer actuation of said transaction selection means and said amount selection means, when said at least one remote unit is in said on-line and off-line modes, for processing independently of said central processing unit said at least one customer-selected transaction for said at least one customer-selected amount in accordance with said account balance information in said reply message when said at least one remote unit is in said on-line mode and in accordance with said credit information read from said card when said at least one remote unit is in said off-line mode, respectively.

30. In an automated banking system having a central processing unit coupled to a remote unit via a communication link, the method of:
responding to insertion at said remote unit of a card with customer-identifying information encoded thereon by reading said customer-identifying information,
preparing and transmitting a request message containing said customer-identifying information to said central processing unit via said communication link,
responding to said request message by preparing and transmitting to said remote unit via said communication link a reply message containing account data associated with said identified customer, said account data including (a) account description information designating multiple different accounts of said customer and (b) account balance information for said multiple different accounts of said customer,
permitting said customer to select a series of different transactions involving said multiple different accounts, including cash withdrawal and/or fund transfer and/or deposits and/or payments in accordance with said account description information in said reply message,
permitting customer-entry of a series of different transaction amounts corresponding, respectively, to transactions of said series of different transactions,
responding to customer selection of a transaction and customer entry of an amount by processing independently of said central processing unit said different customer-selected transactions for said different customer-entered amounts in accordance with said account balance information in said reply message so as to determine the allowability of said series of different transactions by transaction processing measns at said remote unit, whereby a customer upon a single insertion of his card may perform a series of different transactions involving different accounts for different amounts based upon transmission of a single request message to said central processing unit containing said customer-identifying information and receipt of a single reply message from said central processing unit containing said account data, thereby economizing utilization of said communication link and said central processing unit.

31. The method of claim 30 further including the steps of:

permitting said customer to select an actual account balance inquiry transaction prior to the availability for selection of other transactions, responding to customer selection of an actual account balance inquiry transaction by printing said actual account balances prior to said other customer-selected transactions, whereby a customer may obtain his actual account balances in secrecy and, thus, learn what actual balances are contained in his various accounts before performing other transactions, thereby facilitating transactions in amounts permitted by said account balance information transmitted from said central processing unit.

32. The method of claim 30 further including the steps of:

supplying a working balance associated with each one of said customer's accounts for inclusion in said reply message, each said working balance not exceeding the actual account balance for said associated one of said customer's accounts, and wherein said processing of said customer-selected transactions is done in accordance with said working balances for said customer's accounts, each of said customer-selected transactions being permitted in an amount which does not exceed the working balance of said customer's account from which said customer indicates said transaction amount is to be deducted, whereby system operation compensates for presumed customer debits in transit and customer-selected transactions based on deposits which have been posted by a bank but which have not yet cleared.

33. The method of claim 32 further including the steps of:

supplying an extended credit balance for inclusion in said reply message, processing customer-selected cash withdrawals in accordance with said working balances for said customer's accounts and said extended credit balance by applying the balance of said extended credit balance to each of said customer-selected cash withdrawals in which said customer-entered amount exceeds the working balance of said customer's account from which said customer indicates said cash withdrawal is to be deducted, permitting each said customer-selected cash withdrawal in an amount which does not exceed the sum of the working balance of said customer's account from which said customer indicates said cash withdrawal is to be deducted and the balance of said extended credit balance, dispensing cash in said permitted amount, decrementing said extended credit balance by the amount which said cash withdrawal exceeds said working balance of said customer's account from which is customer indicates said cash withdrawal is to be deducted, whereby the system dispenses cash to said customer in an amount which exceeds the working balance of one of said customer's accounts but which does not exceed the sum of said working balance plus said extended credit balance, thereby facilitating split deposit transactions in which said customer desires to withdraw cash in an amount which exceeds said one or more working balances.

34. The method of claim 33 further including the steps of supplying a predetermined maximum cash limit for inclusion in said reply message and limiting the sum of all customer-selected cash withdrawals to said maximum cash limit.

35. The method of claim 30 further including the steps of supplying a predetermined maximum cash limit for inclusion in said reply message and limiting the sum of all customer-selected cash withdrawals to said maximum cash limit.

36. The method of claim 30 further including the steps of:

analyzing said customer-identifying information read from said card, retaining said card if a memory at said remote unit indicates said card is designated for capture, and wherein said request message is prepared and transmitted only in the event said card is not retained, whereby said remote unit does not utilize communication and central processing unit time when said card has been designated for capture.

37. The method of claim 30 further including the steps of supplying at said central processing unit card updating data for inclusion in said reply message and updating at said remote unit said information on said card in accordance with said card updating data.

38. The method of claim 37 further including the step of retaining said card when said card updating data designated said card for capture.

39. The method of claim 30 further including the steps of:

generating at said central processing unit a first security code for inclusion in said reply message, generating at said remote unit a second security code, comparing said first security code with said second security code at said remote unit, denying said transactions in the event said first and second security codes do not compare favorably, whereby security codes are used to maintain system integrity in the event said communication link is accessed for the purpose of, supplying a simulated reply message to said remote unit for the purpose of conducting fraudulent transactions.

40. The method of claim 30 further including the steps of:

preparing and transmitting a completion record of said customer-selected transactions to said central processing unit via said communicaton line after said series of different transactions, and updating customer account data stored at said central processing unit in accordance with said completion message received from said remote unit, whereby said central processing unit assumes responsibility for updating customer account data stored at said central processing unit based on transactions processed by said remote unit.

41. The method of claim 30 further including the steps of:

determining from said account description information if a plurality of said multiple different accounts can serve as the account from which said customer-selected transaction indicates said customer-entered amount is to be deducted and/or to which said customer-selected transaction indicates said customer-entered amount is to be added, and responding to entry of at least one predetermined designation by said customer by determining which of said plurality of said multiple different accounts should serve as said debit and/or credit accounts.

42. In an automated banking system having a central processing unit coupled to a remote unit via a communication link, the method of:

responding to insertion at said remote unit of a card with customer-identifying information encoded thereon by reading said customer-identifying information, preparing and transmitting a request message containing said customer-identifying information to said central processing unit via said communication link, responding to said request message by preparing and transmitting to said remote unit via said communication link a reply message containing account data associated with said identified customer, said account data including (a) account description information designating multiple different accounts of said customer and (b) account balance information for said multiple different accounts of said customer, permitting said customer to select at least one of a plurality of different transactions involving said multiple different accounts, including cash withdrawal and/or fund transfer and/or deposits and/or payments in accordance with said account description information in said reply message, permitting customer-entry of at least one transaction amount corresponding to said at least one transaction, responding to customer selection of a transaction and customer entry of an amount by processing independently of said central processing unit said at least one customer-selected transaction for said at least one customer-entered amount in accordance with said account balance information in said reply message so as to determine the allowability of said at least one transaction by transaction processing means at said remote unit, whereby a customer upon a single insertion of his card may perform at least one of a plurality of different transactions involving different accounts for at least one selective amount based upon transmission of a single request message to said central processing unit containing said customer-identifying information and receipt of a single reply message from said central processing unit containing said account data, thereby economizing utilization of said communication link and said central processing unit.

43. In an automated banking system having a central processing unit coupled to a remote unit via a communication link, the method of:

responding to insertion at said remote unit of a card with customer-identifying information encoded thereon by reading said customer-identifying information, preparing and transmitting a request message containing said customer-identifying information to said central processing unit via said communication link, responding to said request message by preparing and transmitting to said remote unit via said communication link a reply message containing account data associated with said identified customer, said account data including account balance information for said customer, permitting customer-entry of a series of different transaction amounts corresponding, respectively, to transactions of a series of different transactions, responding to customer entry of an amount by processing independently of said central processing unit said series of different transactions for said different customer-entered amounts in accordance with said account balance information in said reply message so as to determine the allowability of said series of different transactions by transaction processing means at said remote unit, whereby a customer upon a single insertion of his card may perform a series of different transactions for different amounts based upon transmission of a single request message to said central processing unit containing said customer-identifying information and receipt of a single reply message from said central processing unit containing said account data, thereby economizing utilization of said communication link and said central processing unit.

44. In an automated banking system having a central processing unit coupled to a remote unit via a communication link, the method of:

responding to insertion at said remote unit of a card with customer-identifying information encoded thereon by reading said customer-identifying information, preparing and transmitting a request message containing said customer-identifying information to said central processing unit via said communication link, responding to said request message by preparing and transmitting to said remote unit via said communication link a reply message containing account data associated with said identified customer, said account data including account balance information for said customer, permitting customer-entry of a transaction amount, responding to customer entry of an amount by processing independently of said central processing unit said transaction for said customer-entered amount in accordance with said account balance information in said reply message so as to determine the allowability of said transaction by transaction processing means at said remote unit, whereby a customer upon a single insertion of his card may perform a transaction for a selective amount based upon transmission of a single request message to said central processing unit containing said customer-identifying information and receipt of a single reply message from said central processing unit containing said account data, thereby economizing utilization of said communication link and said central processing unit.

45. In an automated banking system having at least one remote unit alternatively operable in on-line and off-line modes, a central processing unit and a communication link for interconnecting said at least one remote unit and said central processing unit, the method for processing banking transactions including:

responding to insertion at said at least one remote unit of a card with customer-identifying information, credit limit information and permissible transaction information encoded thereon by reading said information, preparing and transmitting a request message containing said customer-identifying information to said central processing unit via said communication link when said at least one remote unit is in said on-line mode, responding to said request message by preparing and transmitting to said at least one remote unit via said communication link a reply message containing account data associated with said identified customer, said account data including (a) account description information designating multiple different accounts of said customer and (b) account balance information for said multiple different accounts of said customer, permitting said customer to select a series of different transactions, including cash withdrawal and/or fund transfer and/or deposits and/or payments, in accordance with said account description information in said reply message from said central processing unit, when said at least one remote unit is in said on-line mode, and in accordance with said permissible transaction information read from said card, when said at least one remote unit is in said off-line mode, respectively, permitting customer-entry of a series of different transaction amounts corresponding, respectively, to transactions of said series of different transactions, responding to customer selection of a transaction and customer entry of an amount, when said at least one remote unit is in said on-line and off-line modes, by processing independently of said central processing unit said different customer-selected transactions for said different customer-entered amounts in accordance with said account balance information in said reply message when said at least one remote unit is in said on-line mode and in accordance with said credit information read from said card when said at least one remote unit is in said off-line mode, respectively.

46. The method of claim 45 further including the steps of:
alternatively generating on-line and off-line command signals at said central processing unit,
transmitting said signals to said at least one remote unit via said communication link, said at least one remote unit being responsive to said on-line command signal for operating in said on-line mode and responsive to said off-line command signal for operating in said off-line mode,
whereby said central processing unit determines the mode of operation of said at last one remote unit.

47. The method of claim 45 further including the step of causing said at least one remote unit to switch its mode of operation from said on-line mode to said off-line mode in response to the nonreceipt of a reply message within a predetermined amount of time after transmission of a request message, whereby use of the system initiated with a remote unit in the on-line mode is completed in the off-line mode when the central processing unit fails to timely transmit a reply message in response to a request message.

48. The method of claim 45 further including the steps of:
analyzing said customer-identifying information read from said card,
retaining said card if a memory at said at least one remote unit indicates said card is designated for capture, and
wherein said request message is prepared and transmitted when said at least one remote unit is in said on-line mode, only in the event said card is not retained, whereby said at least one remote unit does not utilize communication and central processing unit time when said card has been designated for capture and said at least one remote unit is in said on-line mode.

49. The method of claim 45 further including the steps of supplying at said central processing unit card updating data for inclusion in said reply message and updating at said at least one remote unit at least one of said credit limit information and permissible transaction information on said card in accordance with said card updating data when said at least one remote unit is in said on-line mode.

50. The method of claim 49 further including the step of retaining said card when said card updating data designates said card for capture when said at least one remote unit is in said on-line mode.

51. The method of claim 45 further including the steps of:
generating at said central processing unit a first security code for inclusion in said reply message,
generating at said at least one remote unit, when said at least one remote unit is in said on-line mode, a second security code,
comparing at said at least one remote unit said first security code with said second security code when said at least one remote unit is in said on-line mode,
causing said at least one remote unit to operate in said off-line mode in the event said first and second security codes do not compare favorably,
whereby a failure in line security causes the system to switch to the off-line mode and process the transactions in accordance with said credit limit and permissible transaction information on said card.

52. The method of claim 45 further including the steps of:
preparing and transmitting a completion message of said customer-selected transactions to said central processing unit via said communication link after said series of different transactions when said at least one remote unit is in said on-line mode, and
updating customer account data stored at said central processing unit in accordance with said completion message received from said at least one remote unit,
whereby said central processing unit assumes responsibility for updating customer account data stored at said central processing unit based on transactions processed by said at least one remote unit.

53. The method of claim 52 further including the steps of:
- storing a record of said customer-selected transactions when said at least one remote unit is in said off-line mode, and
- preparing and transmitting transaction records stored at said at least one remote unit to said central processing unit for updating said customer account data when said at least one remote unit returns to said on-line mode.

54. The method of claim 45 further including the steps of:
- determining from said account description information, when said at least one remote unit is in said on-line mode, if a plurality of said multiple different accounts can serve as the account from which said customer-selected transaction indicates said customer-entered amount is to be deducted and/or to which said customer-selected transaction indicates said customer-entered amount is to be added, and
- responding to entry of at least one predetermined designation by said customer by determining, when said at least one remote unit is in said on-line mode, which of said plurality of said multiple different accounts should serve as said debit and/or credit accounts.

55. In an automated banking system having at least one remote unit alternatively operable in on-line and off-line modes, a central processing unit and a communication link for interconnecting said at least one remote unit and said central processing unit, the method for processing banking transactions including:
- responding to insertion at said at least one remote unit of a card with customer-identifying information, credit limit information and permissible transaction information encoded thereon by reading said information,
- preparing and transmitting a request message containing said customer-identifying information to said central processing unit via said communication link when said remote unit is in said on-line mode,
- responding to said request message by preparing and transmitting to said at least one remote unit via said communication link a reply message containing account data associated with said identified customer, said account data including (a) account description information designating multiple different accounts of said customer and (b) account balance information for said multiple different accounts of said customer,
- permitting said customer to select at least one of a plurality of different transactions, including cash withdrawal and/or fund transfer and/or deposits and/or payments, in accordance with said account description information in said reply message from said central processing unit, when said at least one remote unit is in said on-line mode, and in accordance with said permissible transaction information read from said card, when said at least one remote unit is in said off-line mode, respectively,
- permitting customer-entry of at least one transaction amount corresponding to said at least one transaction,
- responding to customer selection of a transaction and customer entry of an amount, when said at least one remote unit is in said on-line modes, by processing independently of said central processing unit said different customer-selected transactions for said different customer-entered amounts in accordance with said account balance informaion in said reply message when said at least one remote unit is in said on-line mode and in accordance with said credit information read from said card when said at least one remote unit is in said off-line mode, respectively.

56. In an automated banking system having at least one remote unit alternatively operable in on-line and off-line modes, a central processing unit and a communication link for interconnecting said at least one remote unit and said central processing unit, the method for processing banking transactions including:
- responding to insertion at said at least one remote unit of a card with customer-identifying information, credit limit information and permissible transaction information encoded thereon by reading said information,
- preparing and transmitting a request message containing said customer-identifying and permissible transaction information to said central processing unit via said communication link when said at least one remote unit is in said on-line mode,
- responding to said request message by preparing and transmitting to said at least one remote unit via said communication link a reply message containing account data associated with said identified customer, said account data including (a) account description information designating multiple different accounts of said customer and (b) account balance information for said multiple different accounts of said customer,
- permitting said customer to select a series of different transactions, including cash withdrawal and/or fund transfer and/or deposits and/or payments, in accordance with said account description information in said reply message from said central processing unit, when said at least one remote unit is in said on-line mode, and in accordance with said permissible transaction information read from said card, when said at least one remote unit is in said off-line mode, respectively,
- permitting customer-entry of a series of different transaction amounts corresponding, respectively, to transactions of said series of different transactions,
- responding to customer selection of a transaction and customer entry of an amount, when said at least one remote unit is in said on-line and off-line modes, by processing independently of said central processing unit said different customer-selected transactions for said different customer-entered amounts in accordance with said account balance information in said reply message when said at least one remote unit is in said on-line mode and in accordance with said credit information read from said card when said at least one remote unit is in said off-line mode, respectively.

57. In an automated banking system having at least one remote unit alternatively operable in on-line and off-line modes, a central processing unit and a communication link for interconnecting said at least one remote unit and said central processing unit, the method for processing banking transactions including:
- responding to insertion at said at least one remote unit of a card with customer-identifying information, credit limit information and permissible transaction information encoded thereon by reading and information, preparing and transmitting a request message containing said customer-identifying and permissible transaction information to said central processing unit via said communication link when said at least one remote unit is in said on-line mode, responding to said request message by preparing and transmitting to said at least one remote unit via said communication link a reply message containing account data associated with said identified customer, said account data including (a) account description information, designating multiple different accounts of said customer and (b) account balance information for said multiple different accounts of said customer, permitting said customer to select at least one of a plurality of different transactions, including cash withdrawal and/or fund transfer and/or deposits and/or payments, in accordance with said account description information in said reply message from said central processing unit, when said at least one remote unit is in said on-line mode, and in accordance with said permissible transaction information read from said card, when said at least one remote unit is in said off-line mode, respectively, permitting customer-entry of at least one transaction amount corresponding to said at least one transaction, responding to customer selection of a transaction and customer entry of an amount, when said at least one remote unit is in said on-line and off-line modes, by processing independently of said central processing unit said different customer-selected transactions for said different customer-entered amounts in accordance with said account balance information in said reply message when said at least one remote unit is in said on-line mode and in accordance with said credit information read from said card when said at least one remote unit is in said off-line mode, respectively.

* * * * *

UNITED STATES PATENT AND TRADEMARK OFFICE
CERTIFICATE OF CORRECTION

PATENT NO. : 4,114,027
DATED : September 12, 1978
INVENTOR(S) : Charles E. Slater et al It is certified that error appears in the above-identified patent and that said Letters Patent are hereby corrected as shown below:

Col. 1, Line 43   "occur"          should be --occurs--

Col. 2, Line 57   "depent"         should be --depend--

Col. 3, Line 5    between "has" and "an" insert --as--

Col. 3, Line 23   after "off-line" insert --mode--

Col. 4, Line 3    "description"    should be --descriptions--

Col. 4, Line 59   "with"           should be --will--

Col. 6, Line 30   "unit"           should be --units--

Col. 6, Line 30   "$I_1, I...I_n$"   should be --$I_1, I_2...I_n$--

Col. 7, Line 31   "each"           should be --Each--

Col. 8, Line 26   between "reference" (first occurrence) and "may" (second occurrence) delete --may be reference--

Col. 8, Line 28   "plush"          should be --push--

Col. 9, Line 4    "38"             should be --39--

Col. 9, Line 5    "30"             should be --39--

Col. 9, Line 38   "Vos"            should be --Voss--

UNITED STATES PATENT AND TRADEMARK OFFICE
CERTIFICATE OF CORRECTION

PATENT NO. : 4,114,027
DATED : September 12, 1978
INVENTOR(S) : Charles E. Slater et al It is certified that error appears in the above-identified patent and that said Letters Patent are hereby corrected as shown below:

Col. 9, Line 48 "usuable" should be --usable--

Col. 9, Line 49 "film" should be --file--

Col. 12, line 50 "messages" should be --message--

Col. 12, Line 51 between "update" and "351" insert --data--

Col. 12, Line 64 "assemblies" should be --assembles--

Col. 13, Line 18 "in" should be --on--

Col. 13, Line 22 between "in" and "reply" insert --the--

Col. 14, Line 44 "exceess" should be --exceeds--

Col. 16, Line 4 "authorized" should be --authorizes--

Col. 16, Line 39 "12" should be --2--

Col. 16, Line 42 "exists" should be --exits--

Col. 16, Line 49 "ata" should be --data--

Col. 17, Line 22 between "$216_1$," and "..." insert --$216_2$--

Col. 18, Line 24 "200" should be --220--

Col. 18, Line 66 after "223" insert --.--

UNITED STATES PATENT AND TRADEMARK OFFICE
CERTIFICATE OF CORRECTION

PATENT NO. : 4,114,027

DATED : September 12, 1978

INVENTOR(S) : Charles E. Slater et al

It is certified that error appears in the above-identified patent and that said Letters Patent are hereby corrected as shown below:

| | | |
|---|---|---|
| Col. 18, Line 67 | before "compares" insert --Expiration date comparator 223-- | |
| Col. 19, Line 32 | "date" | should be --data-- |
| Col. 19, Line 40 | after "and" insert --suffix 301 which comprises data in account number and-- | |
| Col. 21, Line 12 | "shot" | should be --short-- |
| Col. 21, Line 25 | "four character" should be --four-character-- | |
| Col. 22, Line 13 | between "update" and "352" insert --data-- | |
| Col. 27, line 7 | "1265" | should be --125-- |
| Col. 29, Line 42 | "15" | should be --115-- |
| Col. 31, Line 58 | "select" | should be "selector-- |
| Col. 32, Line 5 | "IN" | should be --In-- |
| Col. 32, Line 58 | "compatator" | should be --comparator-- |
| Col. 36, Line 46 | "ih" | should be --in-- |
| Col. 38, Line 13 | "balance" | should be --balances-- |
| Col. 40, Line 44 | "depressed" | should be --depresses-- |

UNITED STATES PATENT AND TRADEMARK OFFICE
CERTIFICATE OF CORRECTION

PATENT NO. : 4,114,027
DATED : September 12, 1978
INVENTOR(S) : Charles E. Slater et al It is certified that error appears in the above-identified patent and that said Letters Patent are hereby corrected as shown below:

Col. 40, Line 45   "uniyt"         should be --unit--

Col. 44, Line 60   "to"            should be --in--

Col. 45, Line 66   "the"           should be --The--

Col. 49, Line 14   "mount"         should be --amount--

Col. 49, Line 24   "allowabiity"   should be --allowability--

Col. 49, Line 36   between "least" and "remote" insert --one--

Col. 51, Line 21   "record"        should be --records--

Col. 53, Line 27   "sellection"    should be --selection--

Col. 53, Line 30   "or"            should be --of--

Col. 54, Line 9    between "from" and "central" insert --said--

Col. 55, Line 5    "measns"        should be --means--

Col. 56, Line 7    "is" (first occurrence) should be --said--

Col. 56, Line 45   "designated"    should be --designates--

Col. 56, Line 64   "line"          should be --link--

Col. 61, Line 41   between "when said" and "remote" insert --at least one--

UNITED STATES PATENT AND TRADEMARK OFFICE
CERTIFICATE OF CORRECTION

PATENT NO.   : 4,114,027
DATED        : September 12, 1978
INVENTOR(S)  : Charles E. Slater et al It is certified that error appears in the above–identified patent and that said Letters Patent are hereby corrected as shown below:

Col. 61, Line 66   after "on-line" insert --and off-line--

Col. 62, Line 2    "informaion"  should be --information--

Col. 63, Line 1    "and"         should be --said--.

Signed and Sealed this

Twenty-fifth Day of March 1980

[SEAL]

Attest:

SIDNEY A. DIAMOND

*Attesting Officer*     *Commissioner of Patents and Trademarks*